United States Patent
Sohara et al.

(10) Patent No.: US 7,466,189 B2
(45) Date of Patent: Dec. 16, 2008

(54) SEMICONDUCTOR INTEGRATED CIRCUIT

(75) Inventors: Yasuyuki Sohara, Tokyo (JP);
Masayasu Tanaka, Itami (JP); Yasuhiro Okazaki, Itami (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 11/618,221

(22) Filed: Dec. 29, 2006

(65) Prior Publication Data

US 2007/0194834 A1    Aug. 23, 2007

(30) Foreign Application Priority Data

Feb. 15, 2006   (JP) .............................. 2006-038210

(51) Int. Cl.
*G05F 1/10* (2006.01)

(52) U.S. Cl. ............................. 327/536; 363/59; 363/60

(58) Field of Classification Search ................. 327/536; 363/59, 60

See application file for complete search history.

(56) References Cited

U.S. PATENT DOCUMENTS

| 6,960,955 | B2* | 11/2005 | Nonaka | 327/536 |
| 7,005,912 | B2* | 2/2006 | Nonaka | 327/536 |
| 7,072,193 | B2* | 7/2006 | Lin | 363/59 |
| 7,148,740 | B2* | 12/2006 | Kobayashi et al. | 327/536 |

FOREIGN PATENT DOCUMENTS

JP    2005-57860 A    3/2005

* cited by examiner

*Primary Examiner*—Kenneth B. Wells
(74) *Attorney, Agent, or Firm*—Mattingly, Stanger, Malur & Brundidge, P.C.

(57) ABSTRACT

The present invention provides a charge pump circuit capable of achieving desired boosting operation even when a high-side switch for precharge or a low-side switch for driving output is constructed by a low-withstand-voltage transistor. The high level of a drive input signal for driving a high-side switch for precharge and a low-side switch for driving output in response to a clock signal is set to the level of a boosted output voltage. The low level of the drive input signal is set to the level of an input voltage, not ground potential.

18 Claims, 14 Drawing Sheets

SEMICONDUCTOR INTEGRATED CIRCUIT

CROSS-REFERENCE TO RELATED APPLICATION

The present application claims priority from Japanese patent application No. 2006-38210 filed on Feb. 15, 2006, the content of which is hereby incorporated by reference into this application.

BACKGROUND OF THE INVENTION

The present invention relates to a semiconductor integrated circuit having a booster circuit constructed by a charge pump circuit and, more particularly, to a technique useful to reduce a chip occupying area of the booster circuit.

In a booster circuit constructed by a charge pump circuit, as described in Japanese Unexamined Patent Publication No. 2005-57860, a high-side switch for precharge and a low-side switch for precharge are connected to one end and the other end of a capacitor, respectively, and a high-side switch for driving output and a low-side switch for driving output are connected to the other end and the one end of the capacitor, respectively. The four transistors as four switches are driven by clock signals. The period of one of levels of the clock signal is a precharge period in which the booster circuit constructed by a charge pump circuit charges the capacitor with an input voltage to be boosted. The period of the other level of the clock signal is an output driving period in which the booster circuit constructed by a charge pump circuit outputs a boosted voltage obtained by adding a charge voltage of the capacitor to the input voltage. In the precharge period, the high-side switch for precharge connected between the input voltage and the one end of the capacitor is on, and the low-side switch for precharge connected between base potential (ground potential) and the other end of the capacitor is on. Therefore, the charge current flows from the input voltage to the base potential (ground potential) via the capacitor, so that the charge voltage between the one end of the capacitor and the other end increases. In the output driving period, the high-side switch for driving output connected between the input voltage and the other end of the capacitor is on, and the low-side switch for driving output connected between the one end of the capacitor and the output terminal is on. Therefore, the boosted voltage obtained by adding the charge voltage of the capacitor to the input voltage is output from the output terminal. The clock signal changes repeatedly in the sufficient number of cycles between one of the levels and the other level, thereby increasing the charge voltage of the capacitor to the input voltage. Consequently, the boosted voltage from the output terminal is about twice as high as the input voltage.

SUMMARY OF THE INVENTION

Prior to the present invention, the inventors of the present invention have engaged in development of a CCD driving LSI for driving a CCD (Charge Coupled Device) as an image pickup device mounted on a digital still camera, a cellular phone, or the like. An input voltage Vdd supplied in the CCD driving LSI lies in an input range of 2.7 volts to 5.5 volts, so that a double boost voltage output from the booster circuit constructed by a charge pump circuit has to cover an output range of 5.4 volts to 11 volts. In the booster circuit constructed by a charge pump circuit, the maximum double boost voltage which is output from the output terminal is 11 volts and the maximum charge voltage at one end of a capacitor precharged also becomes 11 volts. Prior to the present invention, the inventors of the present invention have examined a driving method in which the low level of a drive signal of a control input terminal of a transistor as a high-side switch for precharge or the low-side switch for driving output is set as the base potential (ground potential). In the driving method, the transistor driven by the low-level drive input signal of the base potential (ground potential) is connected one end of a precharge capacitor whose maximum charge voltage is a double boost voltage 2 Vdd of about 11 volts. It was therefore clarified that a transistor having a high withstand voltage, not a transistor having a low withstand voltage, has to be used as the transistor. Since the device size of the transistor having a high withstand voltage is much larger than that of the transistor having a low withstand voltage, it also revealed a problem such that the chip occupying area of the booster circuit constructed by a charge pump circuit on a semiconductor chip of a CCD driving LSI is extremely large.

The present invention has consequently been achieved on the basis the results of examination made by the inventors herein. Therefore, an object of the invention is to provide a booster circuit capable of achieving a desired boosting operation even when a high-side switch for precharge or a low-side switch for driving output connected to one end of a precharge capacitor whose maximum charge voltage becomes a double boost voltage is constructed by a low withstand voltage transistor. Another object of the invention is to reduce the chip occupying area of a booster circuit on a semiconductor chip of a semiconductor integrated circuit.

The above and other objects and novel features of the present invention will become clear from the description of the specification and the appended drawings.

An outline of representative one of inventions disclosed in the application will be briefly described as follows.

In a booster circuit constructed by a charge pump circuit in a semiconductor integrated circuit according to an embodiment of the present invention, a first transistor (Q11) as a high-side switch for precharge and a second transistor (Q12) as a low-side switch for precharge are connected to one end and the other end of a capacitor (C1), respectively. A third transistor (Q13) as a high-side switch for driving output and a fourth transistor (Q14) as a low-side switch for driving output are connected to the other end and the one end of the capacitor (C1), respectively. The four transistors (Q11, Q12, Q13, and Q14) are driven by a clock signal (CLK). The period of one of levels (high level) of the clock signal (CLK) is a precharge period in which the booster circuit constructed by a charge pump circuit charges the capacitor (C1) by an input voltage (Vdd). The period of the other level (low level) of the clock signal (CLK) is an output drive period in which the booster circuit constructed by the charge pump circuit outputs a boosted output voltage (Vout) obtained by adding a charged voltage (Vcg) of the capacitor (C1) to the input voltage (Vdd). In the precharge period, in response to the clock signal (CLK), the first transistor (Q11) as the high-side switch for precharge connected between the input voltage (Vdd) and the one end of the capacitor (C1) is turned on, and the second transistor (Q12) as the low-side switch for precharge connected between a base potential (Vss) and the other end of the capacitor (C1) is turned on. Therefore, charging current (Ip) flows from the input voltage (Vdd) to the base potential (Vss) via the capacitor (C1), and the charged voltage (Vcg) between the one end and the other end of the capacitor (C1) increases. In the output drive period, in response to the clock signal (CLK), the third transistor (Q13) as the high-side switch for driving output connected between the input voltage (Vdd) and the other end of the capacitor (C1) is turned on, and the fourth transistor (Q14) as the low-side switch for driving output connected between the one end of the capacitor (C1) and the output terminal is turned on. Therefore, the boosted output voltage (Vout) obtained by adding the charged voltage (Vcg) of the capacitor (C1) to the input voltage (Vdd) is output from the output terminal. Particularly, the high level and the low level of a drive input signal (VDHS) for driving an input terminal of the first transistor (Q11) as the high-side switch for precharge and an input terminal of the fourth transistor (Q14) as the low-side switch for driving output in response to the clock signal (CLK) are set to level of the boosted output voltage (Vout) output from the output terminal and level of the input voltage (Vdd), respectively (refer to FIGS. 1 and 2).

According to means of the embodiment of the invention, the first transistor (Q11) as a high-side switch for precharge connected to one end of the capacitor (C1) whose maximum charge voltage is double boost voltage (2 Vdd) and the fourth transistor (Q14) as a low-side switch for driving output are driven by a drive input signal (VDHS) whose high and low levels are set to the level of the boosted output voltage (Vout) which is the double boost voltage, and the level of the input voltage (Vdd), respectively. Since the voltage amplitude of the drive input signal (VDHS) is the value of the input voltage (Vdd), the first transistor (Q11) as the high-side switch for precharge and the fourth transistor (Q14) as the low-side switch for driving output do not have to be constructed by high-withstand-voltage transistors but may be constructed by low-withstand-voltage transistors.

In the booster circuit constructed by a charge pump circuit of the semiconductor integrated circuit according to a concrete mode of the invention, the high level and the low level of a drive input signal (VDLS) for driving the input terminal of the second transistor (Q12) as the low-side switch for precharge and the input terminal of the third transistor (Q13) as the high-side switch for driving output in response to the clock signal (CLK) are set to level of the input voltage (Vdd) and level of the base potential (Vss), respectively (refer to FIGS. 1 and 2).

According to the means of the concrete mode of the invention, the second transistor (Q12) as the low-side switch for precharge and the third transistor (Q13) as the high-side switch for driving output do not have to be constructed by high-withstand-voltage transistors but may be constructed by low-withstand-voltage transistors.

In the booster circuit constructed by the charge pump circuit in the semiconductor integrated circuit according to a more concrete mode of the invention, a fifth transistor (Q15) as a first auxiliary switch is connected between the input voltage (Vdd) and the one end of the capacitor (C1), and a sixth transistor (Q16) as a second auxiliary switch is connected between the one end of the capacitor (C1) and the output terminal for outputting the boosted output voltage (Vout). The high level and the low level of a drive input signal (VDHP, VDHD) for driving the input terminal of the fifth transistor (Q15) as the first auxiliary switch and the input terminal of the sixth transistor (Q16) as the second auxiliary switch in response to the clock signal (CLK) are set to level of the boosted output voltage (Vout) output from the output terminal and level of the base potential (Vss), respectively. The fifth transistor (Q15) as the first auxiliary switch and the sixth transistor (Q16) as the second auxiliary switch have a transistor structure of a withstand voltage higher than that of the first transistor (Q11), the second transistor (Q12), the third transistor (Q13), and the fourth transistor (Q14), and have a device size smaller than those transistors (refer to FIGS. 9, 10, and 11).

The more concrete mode of the invention is effective when the voltage amplitude of the drive input signal (VDHS) is not sufficiently large, that drives the input terminal of the first transistor (Q11) as a high-side switch for precharge and the input terminal of the fourth transistor (Q14) as a low-side switch for driving output at the time of start immediately after supply of the clock signal (CLK) to the booster circuit by the charge pump circuit starts (refer to FIG. 11). According to the means of the more concrete mode of the invention, when the voltage amplitude of the drive input signal (VDHS) whose low level is set to the input voltage (Vdd) is not sufficiently large, the voltage amplitude of the drive input signal (VDHP, VDHD) whose low level is set to the base voltage (Vss) is already sufficiently large. Therefore, the fifth transistor (Q15) as a first auxiliary switch and the sixth transistor (Q16) as a second auxiliary switch can sufficiently execute on/off operation. In the precharge period at the time of start, by turning on the fifth transistor (Q15) as the first auxiliary switch and the second transistor (Q12) as the low-side switch for precharge, the capacitor (C1) is charged with the charged voltage (Vcg) of the input voltage (Vdd). In the output drive period at the time of start, by turning on the third transistor (Q13) as the high-side switch for driving output and the sixth transistor (Q16) as the second auxiliary switch, the boosted output voltage (Vout) obtained by adding the charged voltage (Vcg) of the capacitor (C1) to the input voltage (Vdd) is output from the output terminal. After that, when the voltage amplitude of the drive input signal (VDHS) becomes sufficiently large, the first transistor (Q11) as the high-side switch for precharge and the fourth transistor (Q14) as the low-side switch for driving output are turned on. Consequently, switching operation by the first transistor (Q11), the second transistor (Q12), the third transistor (Q13), and the fourth transistor (Q14) having large device size can be performed, and the booster circuit constructed by the charge pump circuit starts operation of a mode of high load driving capability.

In a booster circuit constructed by a charge pump circuit in a semiconductor integrated circuit according to further another concrete mode of the invention, the first transistor (Q11) is constructed by an N-channel MOS transistor whose P-type well is connected to the input voltage (Vdd), the second transistor (Q12) is constructed by an N-channel MOS transistor whose P-type well is connected to the ground potential (Vss), the third transistor (Q13) is constructed by a P-channel MOS transistor whose N-type well is connected to the input voltage (Vdd), and the fourth transistor (Q14) is constructed by a P-channel MOS transistor whose N-type well is connected to one of the output terminal from which the boosted output voltage (Vout) is output and the one end of the capacitor (C1) (refer to FIGS. 1 and 6).

In the booster circuit constructed by the charge pump circuit in the semiconductor integrated circuit according to further another concrete mode of the invention, the first transistor (Q11) is constructed by an NPN-type bipolar transistor whose collector and emitter are connected to the input voltage (Vdd) and the one end of the capacitor (C1), respectively, and the fourth transistor (Q14) is constructed by a PNP-type bipolar transistor whose emitter and collector are connected to the one end of the capacitor (C1) and the output terminal from which the boosted output voltage (Vout) is output, respectively (refer to FIG. 23).

In the booster circuit constructed by the charge pump circuit in the semiconductor integrated circuit according to further another concrete mode of the invention, a diode (D2) for high-speed charging the capacitor (C1) is connected between the collector and the emitter of the first transistor (Q11), and a diode (D3) for high-speed charging an output capacitor (C2)

connected to the output terminal from which the boosted output voltage (Vout) is output is connected between the emitter and the collector of the fourth transistor (Q14) (refer to FIG. 23).

A booster circuit constructed by a charge pump circuit in the semiconductor integrated circuit according to further another concrete mode of the invention is constructed by cascaded charge pump circuits (CP1 and CP2) in multiple stages. When input voltage (Vdd) is supplied to an ante-stage charge pump circuit (CP1) in the charge pump circuits (CP1 and CP2) in the multiple stages, an ante-stage boosted output voltage (Vout1) is generated from the ante-stage charge pump circuit (CP1). When the ante-stage boosted output voltage (Vout1) generated by the ante-stage charge pump circuit (CP1) is supplied to a post-stage charge pump circuit (CP2) in the charge pump circuits (CP1 and CP2) in the multiple stages, a post-stage boosted output voltage (Vout2) is generated from the post-stage charge pump circuit (CP2) (refer to FIG. 12).

In the post-stage charge pump circuit (CP2), a first transistor (Q21) as a high-side switch for precharge and a second transistor (Q22) as a low-side switch for precharge are connected to one end and the other end of a capacitor (C3), respectively. A third transistor (Q23) as a high-side switch for driving output and a fourth transistor (Q24) as a low-side switch for driving output are connected to the other end and the one end of the capacitor (C3), respectively. The four transistors (Q21, Q22, Q23, and Q24) are driven by a clock signal (CLK). A period of one of levels (high level) of the clock signal (CLK) is a precharge period in which the post-stage charge pump circuit (CP2) charges the capacitor (C3) by the ante-stage boosted output voltage (Vout1). A period of the other level (low level) of the clock signal (CLK) is an output drive period in which the post-stage charge pump circuit (CP2) outputs a post-stage boosted output voltage (Vout2) obtained by adding the charged voltage (Vcg) of the capacitor (C3) to the ante-stage boosted output voltage (Vout1). In the precharge period, in response to the clock signal (CLK) the first transistor (Q21) as the high-side switch for precharge connected between the ante-stage boosted output voltage (Vout1) and the one end of the capacitor (C3) is turned on, and the second transistor (Q22) as the low-side switch for precharge connected between the base potential (Vss) and the other end of the capacitor (C3) is turned on. Therefore, charging current (Ip2) flows from the ante-stage boosted output voltage (Vout1) to the base potential (Vss) via the capacitor (C3), and the charged voltage (Vcg) between the one end and the other end of the capacitor (C3) increases. In the output drive period, in response to the clock signal (CLK), the third transistor (Q23) as the high-side switch for driving output connected between the ante-stage boosted output voltage (Vout1) and the other end of the capacitor (C3) is turned on, and the fourth transistor (Q24) as the low-side switch for driving output connected between the one end of the capacitor (C3) and the output terminal is turned on. Therefore, the post-stage boosted output voltage (Vout2) obtained by adding the charged voltage (Vcg) of the capacitor (C3) to the ante-stage boosted output voltage (Vout1) is output from the output terminal. Particularly, the high level and the low level of a drive input signal (VDHS') for driving an input terminal of the first transistor (Q21) as the high-side switch for precharge and an input terminal of the fourth transistor (Q24) as the low-side switch for driving output in response to the clock signal (CLK) are set to level of the post-stage boosted output voltage (Vout2) and level of the ante-stage boosted output voltage (Vout1), respectively (refer to FIG. 12).

In a booster circuit constructed by a charge pump circuit in the semiconductor integrated circuit according to further another mode of the invention, the high level and the low level of a drive input signal (VDLS') for driving the input terminal of the third transistor (Q23) as the high-side switch for driving output are set to level of the ante-stage boosted output voltage (Vout1) and level of the input voltage (Vdd), respectively (refer to FIG. 12).

In a booster circuit constructed by a charge pump circuit in the semiconductor integrated circuit according to further another mode of the invention, a fifth transistor (Q15) as a first auxiliary switch is connected between the ante-stage boosted output voltage (Vout1) and the one end of the capacitor (C3), a sixth transistor (Q16) as a second auxiliary switch is connected between the one end of the capacitor (C3) and the output terminal for outputting the post-stage boosted output voltage (Vout2). The high level and the low level of a drive input signal (VDHP, VDHD) for driving the input terminal of the fifth transistor (Q15) as the first auxiliary switch and the input terminal of the sixth transistor (Q16) as the second auxiliary switch in response to the clock signal (CLK) are set to level of the post-stage boosted output voltage (Vout2) output from the output terminal and level of the base potential (Vss), respectively. The fifth transistor (Q15) as the first auxiliary switch and the sixth transistor (Q16) as the second auxiliary switch have a transistor structure of a withstand voltage higher than that of the first transistor (Q11), the second transistor (Q12), the third transistor (Q13), and the fourth transistor (Q14), and have a device size smaller than those transistors (refer to FIG. 12).

In a booster circuit constructed by a charge pump circuit in the semiconductor integrated circuit according to further another mode of the invention, a first transistor (Q11) as a high-side switch for precharge and a second transistor (Q12) as a low-side switch for precharge are connected to one end and the other end of a capacitor (C1), respectively. A third transistor (Q13) as a high-side switch for driving output and a fourth transistor (Q14) as a low-side switch for driving output are connected to the other end and the one end of the capacitor (C1), respectively. The booster circuit includes an input voltage level detection circuit (Vdd_Dis_Cir) for detecting level of the input voltage (Vdd) and a base voltage generating circuit (VBB_Gen) for generating base voltages (VBB) at a plurality of levels. One base voltage (VBB) selected from the base voltages (VBB) at the plurality of levels in response to a level detection result of the input voltage (Vdd) by the input voltage level detection circuit (Vdd_Dis_Cir) is supplied as an output of the base voltage generating circuit (VBB_Gen) to the third transistor (Q23) as the high-side switch for driving output. The four transistors (Q11, Q12, Q13, and Q14) are driven by a clock signal (CLK). A period of one of levels (high level) of the clock signal (CLK) is a precharge period of charging the capacitor (C1) by an input voltage (Vdd), a period of the other level (low level) of the clock signal (CLK) is an output drive period for outputting a boosted output voltage (Vout). In the precharge period, in response to the clock signal (CLK), the first transistor (Q11) as the high-side switch for precharge connected between the input voltage (Vdd) and the one end of the capacitor (C1) is turned on, and the second transistor (Q12) as the low-side switch for precharge connected between a base potential (Vss) and the other end of the capacitor (C1) is turned on. Therefore, charging current (Ip) flows from the input voltage (Vdd) to the base potential (Vss) via the capacitor (C1), and the charged voltage (Vcg) between the one end and the other end of the capacitor (C1) increases. In the output drive period, in response to the clock signal (CLK), the third transistor (Q13) as the high-side switch for driving output connected between the selected one base voltage (VBB) generated from the output of the base voltage generating circuit (VBB_Gen) and the other end of the capacitor (C1) is turned on, and the fourth transistor (Q14) as the low-side switch for driving output connected between the one end of the capacitor (C1) and the output terminal is turned on. Therefore, the boosted output voltage (Vout) obtained by adding the charged voltage (Vcg) of the capacitor (C1) to the selected one base voltage (VBB) is output from the output terminal. Particularly, the high level and the low level of a drive input signal (VDHS) for driving an input terminal of the first transistor (Q11) as the high-side switch for precharge and an input terminal of the fourth transistor (Q14) as the low-side switch for driving output in response to the clock signal (CLK) are set to level of the boosted output voltage (Vout) and level of the input voltage (Vdd), respectively (refer to FIG. 14).

In a booster circuit constructed by a charge pump circuit in the semiconductor integrated circuit according to further another mode of the invention, the high level and the low level of a drive input signal (VDLS) for driving the input terminal of the second transistor (Q12) as the low-side switch for precharge and the input terminal of the third transistor (Q13) as the high-side switch for driving output are set to level of the input voltage (Vdd) and level of the base potential (Vss) respectively (refer to FIG. 14).

In a booster circuit constructed by a charge pump circuit in the semiconductor integrated circuit according to further another mode of the invention, a fifth transistor (Q15) as a first auxiliary switch is connected between the input voltage (Vdd) and the one end of the capacitor (C1), a sixth transistor (Q16) as a second auxiliary switch is connected between the one end of the capacitor (C1) and the output terminal for outputting the boosted output voltage (Vout). The high level and the low level of a drive input signal (VDHP, VDHD) for driving the input terminal of the fifth transistor (Q15) as the first auxiliary switch and the input terminal of the sixth transistor (Q16) as the second auxiliary switch in response to the clock signal (CLK) are set to level of the boosted output voltage (Vout) output from the output terminal and level of the base potential (Vss), respectively. The fifth transistor (Q15) as the first auxiliary switch and the sixth transistor (Q16) as the second auxiliary switch have a transistor structure of a withstand voltage higher than that of the first transistor (Q11), the second transistor (Q12), the third transistor (Q13), and the fourth transistor (Q14), and have a device size smaller than those transistor (refer to FIG. 14).

A booster circuit constructed by a charge pump circuit in the semiconductor integrated circuit according to further another mode of the invention is constructed by cascaded charge pump circuits (CP1 and CP2) in multiple stages. When input voltage (Vdd) is supplied to an ante-stage charge pump circuit (CP1) in the charge pump circuits (CP1 and CP2) in the multiple stages, an ante-stage boosted output voltage (Vout1) is generated from the ante-stage charge pump circuit (CP1). When the ante-stage boosted output voltage (Vout1) generated by the ante-stage charge pump circuit (CP1) is supplied to a post-stage charge pump circuit (CP2) in the charge pump circuits (CP1 and CP2) in the multiple stages, a post-stage boosted output voltage (Vout2) is generated from the post-stage charge pump circuit (CP2) (refer to FIG. 17).

In the post-stage charge pump circuit (CP2), a first transistor (Q21) as a high-side switch for precharge and a second transistor (Q22) as a low-side switch for precharge are connected to one end and the other end of a capacitor (C3), respectively. A third transistor (Q23) as a high-side switch for driving output and a fourth transistor (Q24) as a low-side switch for driving output are connected to the other end and the one end of the capacitor (C3), respectively. The booster circuit includes an input voltage level detection circuit (Vdd_Dis_Cir) for detecting level of the input voltage (Vdd) and a base voltage generating circuit (VBB_Gen) for generating base voltages (VBB) at a plurality of levels. One base voltage (VBB) selected from the base voltages (VBB) at the plurality of levels in response to a level detection result of the input voltage (Vdd) by the input voltage level detection circuit (Vdd_Dis_Cir) is supplied as an output of the base voltage generating circuit (VBB_Gen) to the third transistor (Q23) as the high-side switch for driving output. The four transistors (Q21, Q22, Q23, and Q24) are driven by a clock signal (CLK). A period of one of levels (high level) of the clock signal (CLK) is a precharge period in which the post-stage charge pump circuit (CP2) charges the capacitor (C3) by the ante-stage boosted output voltage (Vout1). A period of the other level (low level) of the clock signal (CLK) is an output drive period in which the post-stage charge pump circuit (CP2) outputs a post-stage boosted output voltage (Vout2) obtained by adding the charged voltage (Vcg) of the capacitor (C3) to the selected base voltage (VBB). In the precharge period, in response to the clock signal (CLK), the first transistor (Q21) as the high-side switch for precharge connected between the ante-stage boosted output voltage (Vout1) and the one end of the capacitor (C3) is turned on, and the second transistor (Q22) as the low-side switch for precharge connected between the base potential (Vss) and the other end of the capacitor (C3) is turned on. Therefore, charging current (Ip) flows from the ante-stage boosted output voltage (Vout1) to the base potential (Vss) via the capacitor (C3), and the charged voltage (Vcg) between the one end and the other end of the capacitor (C3) increases. In the output drive period, in response to the clock signal (CLK), the third transistor (Q23) as the high-side switch for driving output connected between the selected base voltage (VBB) generated from the output of the base voltage generating circuit (VBB_Gen) and the other end of the capacitor (C3) is turned on, and the fourth transistor (Q24) as the low-side switch for driving output connected between the one end of the capacitor (C3) and the output terminal is turned on. Therefore, the post-stage boosted output voltage (Vout2) obtained by adding the charged voltage (Vcg) of the capacitor (C3) to the selected base voltage (VBB) is output from the output terminal. In particular, the high level and the low level of a drive input signal (VDHS') for driving an input terminal of the first transistor (Q21) as the high-side switch for precharge and an input terminal of the fourth transistor (Q24) as the low-side switch for driving output in response to the clock signal (CLK) are set to level of the post-stage boosted output voltage (Vout2) and level of the ante-stage boosted output voltage (Vout1), respectively.

In a booster circuit constructed by a charge pump circuit in the semiconductor integrated circuit according to further another mode of the invention, the high level and the low level of a drive input signal (VDLS') for driving the input terminal of the third transistor (Q23) as the high-side switch for driving output are set to level of the ante-stage boosted output voltage (Vout1) and level of the input voltage (Vdd), respectively (refer to FIG. 17).

In a booster circuit constructed by a charge pump circuit in the semiconductor integrated circuit according to further another mode of the invention, a fifth transistor (Q15) as a first auxiliary switch is connected between the ante-stage boosted output voltage (Vout1) and the one end of the capacitor (C3), and a sixth transistor (Q16) as a second auxiliary switch is connected between the one end of the capacitor (C3) and the output terminal for outputting the post-stage boosted output voltage (Vout2). The high level and the low level of a drive input signal (VDHP, VDHD) for driving the input terminal of the fifth transistor (Q15) as the first auxiliary switch and the input terminal of the sixth transistor (Q16) as the second auxiliary switch in response to the clock signal (CLK) are set to level of the post-stage boosted output voltage (Vout2) output from the output terminal and level of the base potential (Vss) respectively. The fifth transistor (Q15) as the first auxiliary switch and the sixth transistor (Q16) as the second auxiliary switch have a transistor structure of a withstand voltage higher than that of the first transistor (Q11), the second transistor (Q12), the third transistor (Q13), and the fourth transistor (Q14), and have a device size smaller than those transistors (refer to FIG. 17).

Effects obtained by representative one of the inventions disclosed in the application will be briefly described as follows.

The present invention can provide a booster circuit constructed by a charge pump circuit capable of achieving desired boosting operation even when a high-side switch for precharge or a low-side switch for driving output connected to one end of a precharge capacitor whose maximum charge voltage becomes double boost voltage is constructed by a low-withstand-voltage transistor.

DETAILED DESCRIPTION OF THE PREFERRED EMBODIMENTS

Configuration of Booster Circuit by Charge Pump Circuit

Figure 1:
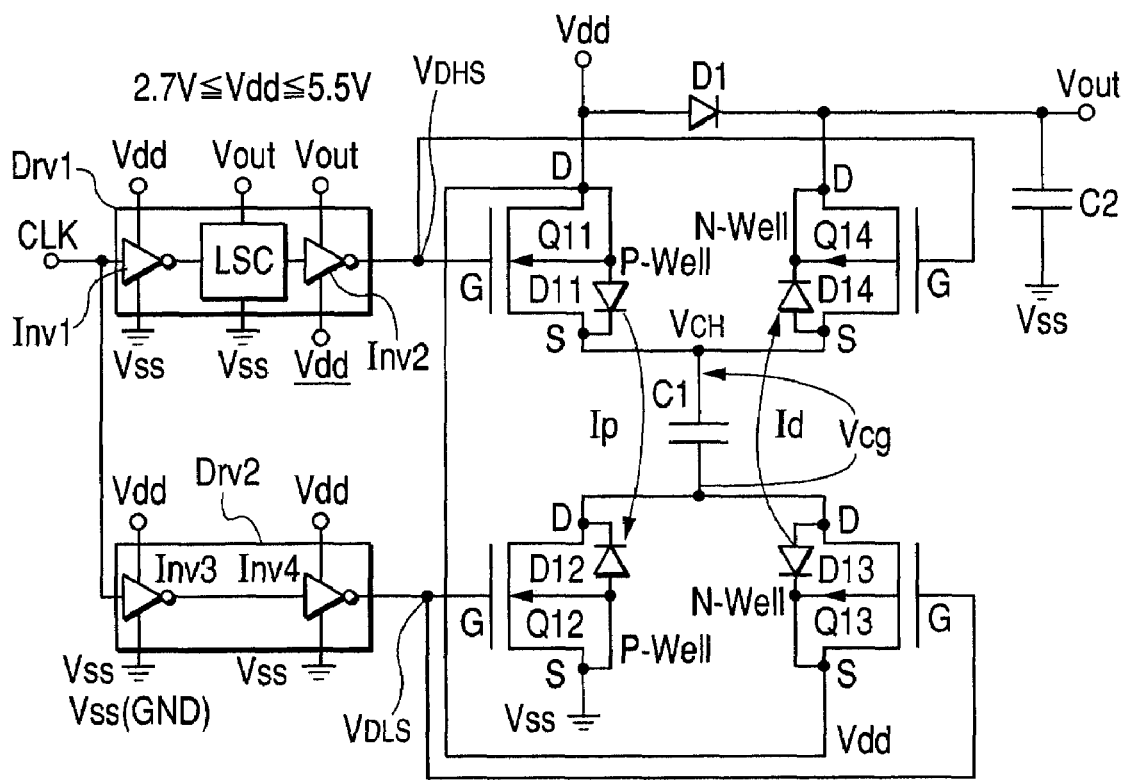
FIG. 1 is a diagram showing the configuration of a booster circuit constructed by a charge pump circuit provided on the chip of a semiconductor integrated circuit according to an embodiment of the invention.

FIG. 1 is a diagram showing the configuration of a booster circuit constructed by a charge pump circuit provided on the chip of a semiconductor integrated circuit according to an embodiment of the invention.

As shown in the diagram, in the booster circuit constructed by the charge pump circuit, a first transistor Q11 as a high-side switch for precharge and a second transistor Q12 as a low-side switch for precharge are connected to one end and the other end of a capacitor C1, respectively. A third transistor Q13 as a high-side switch for driving output and a fourth transistor Q14 as a low-side switch for driving output are connected to the other end and the one end of the capacitor C1, respectively. The four transistors Q11, Q12, Q13, and Q14 are driven by a clock signal CLK. The period of one of levels (high level) of the clock signal CLK is a precharge period in which the booster circuit constructed by a charge pump circuit charges the capacitor C1 with an input voltage Vdd. The period of the other level (low level) of the clock signal is an output driving period in which the booster circuit constructed by a charge pump circuit outputs a boosted output voltage Vout obtained by adding a charge voltage Vcg of the capacitor to the input voltage Vdd. In the precharge period, in response to the clock signal CLK, the first transistor Q1 as a high-side switch for precharge connected between the input voltage Vdd and the one end of the capacitor C1 is on, and the second transistor Q12 as a low-side switch for precharge connected between the base potential Vss and the other end of the capacitor C1 is on. Therefore, charge current Ip flows from the input voltage Vdd to the base potential Vss via the capacitor C1, so that the charge voltage Vcg between the one end of the capacitor C1 and the other end increases. In the output driving period, in response to the clock signal CLK, the third transistor Q13 as a high-side switch for driving output connected between the input voltage Vdd and the other end of the capacitor C1 is on, and the fourth transistor Q14 as a low-side switch for driving output connected between the one end of the capacitor C1 and the output terminal is on. Therefore, the boosted output voltage Vout obtained by adding the charge voltage Vcg of the first capacitor C1 to the input voltage Vdd is output from the output terminal. Specifically, the high level and the low level of a drive input signal VDHS for driving the input terminal of the first transistor Q11 as a high-side switch for precharge and the input terminal of the fourth transistor Q14 as a low-side switch for driving output are set to the level of the boosted output voltage Vout output from the output terminal and the level of the input voltage Vdd, respectively. That is, a major characteristic of the embodiment is that the low level of the drive input signal VDHS for driving the input terminal of the first transistor Q11 and the input terminal of the fourth transistor Q14 is set to the level of the input voltage Vdd, not the ground potential Vss (GND).

Specifically, the first transistor Q11 as a high-side switch for precharge connected to one end of the capacitor C1 whose maximum charge voltage becomes a double boost voltage 2 Vdd and the fourth transistor Q14 as a low-side switch for driving output are driven by the drive input signal VDHS whose high and low levels are set to the level of the boosted output voltage Vout which becomes the double boost voltage 2 Vdd and the level of the input voltage Vdd, respectively. As a result, the voltage amplitude of the drive input signal VDHS becomes the value of the input voltage Vdd, so that the first transistor Q11 as a high-side switch for precharge and the fourth transistor Q14 as a low-side switch for driving output do not have to be high withstand voltage transistors but may be low withstand voltage transistors. As shown in FIG. 1, a first drive circuit Drv1 for driving the gate G of an N-channel MOSFET of the first transistor Q11 as a high-side switch for precharge and the gate G of a P-channel MOSFET of the fourth transistor Q14 as a low-side switch for driving output in response to the clock signal CLK is constructed by an inverter Inv1, a level shift circuit LSC, and an inverter Inv2. Since the input voltage Vdd and the ground voltage Vss as the base potential are supplied to the inverter Inv1 responding to the clock signal CLK, the differential voltage between the input voltage Vdd and the ground voltage Vss is supplied as the operation power source voltage to the inverter Inv1. Therefore, the high level and the low level of an output signal from the inverter Inv1 are set to the level of the input voltage Vdd and the level of the ground voltage Vss, respectively. To the level shifting circuit LSC responding to the output signal of the inverter Inv1, the boosted output voltage Vout which becomes the double boost voltage 2 Vdd and the ground voltage Vss as the base potential are supplied. To the level shifting circuit LSC, the difference voltage between the boost output voltage Vout which becomes the double boost voltage 2 Vdd and the ground voltage Vss is supplied as the operation power source voltage. Therefore, the high level and the low level of an output signal from the level shifting circuit LSC are set to the level of the boost output voltage Vout which becomes the double boost voltage 2 Vdd and the level of the ground voltage Vss, respectively. To the inverter Inv2 responding to the output signal of the level shifting circuit LSC, the boosted output voltage Vout which becomes the double boost voltage 2 Vdd and the input voltage Vdd are supplied. To the inverter Inv2, the difference voltage between the boosted output voltage Vout which becomes the double boost voltage 2 Vdd and the input voltage Vdd is supplied as operation power source voltage. Therefore, the high level and the low level of the output signal of the inverter Inv2 are set to the levels of the boost output voltage Vout which becomes the double boost voltage 2 Vdd and the input voltage Vdd, respectively. As shown in FIG. 1, a second drive circuit Drv2 for driving the gate G of an N-channel MOSFET of the second transistor Q12 as a low-side switch for precharge and the gate G of a P-channel MOSFET of the third transistor Q13 as a high-side switch for driving output in response to the clock signal CLK is constructed by inverters Inv3 and Inv4. To the inverter Inv3 responding to the clock signal CLK, the input voltage Vdd and the ground voltage Vss as the base potential are supplied. To the inverter Inv3, the difference voltage between the input voltage Vdd and the ground voltage Vss is supplied as the operation power source voltage. Therefore, the high level and the low level of an output signal of the inverter Inv3 are set to the level of the input voltage Vdd and the level of the ground voltage Vss, respectively. Also to the inverter Inv4 responding to the output signal of the inverter Inv3, the input voltage Vdd and the ground voltage Vss as the base potential are supplied. To the inverter Inv4, the difference voltage between the input voltage Vdd and the ground voltage Vss is supplied as the operation power source voltage. Therefore, the high level and the low level of an output signal of the inverter Inv4 are set to the level of the input voltage Vdd and the level of the ground voltage Vss, respectively.

The input voltage Vdd is supplied to the N-type drain D and the P-type well P-Well of the N-channel MOSFET of the first transistor Q11 as a high-side switch for precharge, and the N-type source S of the N-channel MOSFET of the first transistor Q11 is connected to one end of the capacitor C1. Between the P-type well P-Well and the N-type source S of the first transistor Q11, a parasitic diode D11 formed by the P-type well P-Well and the N-type source S exists. Therefore, even when the first transistor Q11 as a high-side switch for precharge is in an off state, precharge current Ip can be passed to the capacitor C1 via the parasitic diode D11. That is, the parasitic diode D11 starts high-speed charging of the precharge capacitor C1 at the time of power-on.

The P-type drain D and the N-type well N-Well of the P-channel MOSFET of the fourth transistor Q14 as a low-side switch for driving output are connected to an output terminal for outputting the boosted output voltage Vout, and the P-type source S of the P-channel MOSFET of the fourth transistor Q14 is connected to one end of the capacitor C1. Between the P-type source S and the N-type well N-Well of the fourth transistor Q14, a parasitic diode D14 formed by the P-type source S and the N-type well N-Well exists. Therefore, even when the fourth transistor Q14 as a low-side switch for driving output is in an off state, output drive current Id from the capacitor C1 can flow via the parasitic diode D14. That is, the parasitic diode D14 starts high-speed charging of an output capacitor C2 at the time of power-on.

The N-type source S and the P-type well P-Well of the N-channel MOSFET of the second transistor Q12 as a low-side switch for precharge are connected to the ground voltage Vss as a base potential, and the N-type drain D of the N-channel MOSFET of the second transistor Q12 is connected to the other end of the capacitor C1. Between the N-type drain D and the P-type well P-well of the second transistor Q12, a parasitic diode D12 formed by the N-type drain D and the P-type well P-Well exists.

The input voltage Vdd is supplied across the P-type source S and the N-type well N-Well of the P-channel MOSFET of the third transistor Q13 as a high-side switch for driving output. The P-type drain D of the P-channel MOSFET of the third transistor Q13 is connected to the other end of the capacitor C1. Between the P-type drain D and the N-type well N-Well of the P-channel MOSFET of the third transistor Q13, a parasitic diode D13 formed by the P-type drain D and the N-type well N-Well exists.

Between the input voltage Vdd and the output terminal for outputting the boosted output voltage Vout, a diode D1 as a rectifying device for activation acceleration at the time of power-on is connected. Therefore, immediately after the input voltage Vdd is applied, even when the on/off operation of the four transistors Q11, Q12, Q13, and Q14 driven in response to the clock signal CLK is insufficient, charging of the output capacitor C2 via the diode D1 as a rectifying device can start at high speed.

Figure 2:
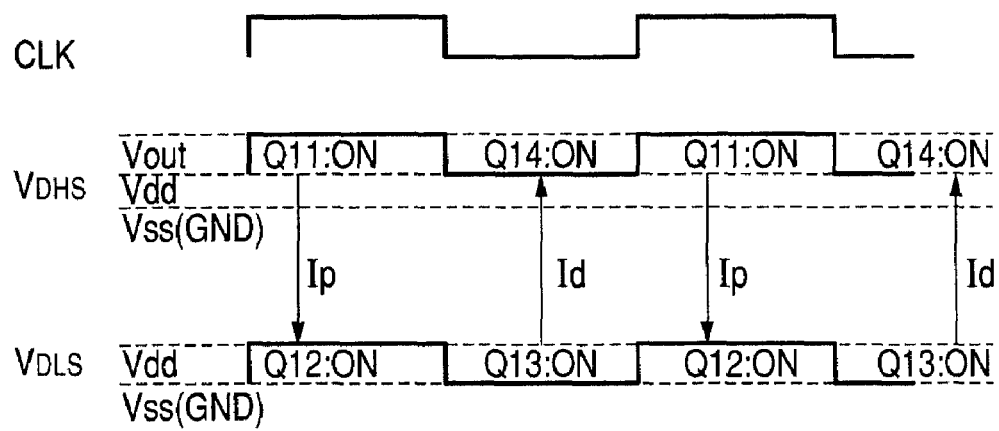
FIG. 2 is a waveform chart for explaining the operation of the booster circuit constructed by a charge pump circuit shown in FIG. 1.

The designation of the source S and the drain D of a MOSFET are determined according to the directions of current in the drain/source path of the MOSFET. In an N-channel MOSFET, a terminal to which current in the drain/source path flows is called the drain D, and a terminal from which current in the drain/source path flows out is called the source S. On the contrary, in a P-channel MOSFET, a terminal to which current in the drain/source path flows is called the source S, and a terminal from which the current in the drain/source path flows out is called the drain D. Obviously, when the direction of the current in the drain/source path of the MOSFET is reversed, the source S and the drain D of a MOSFET operate as the drain and the source, respectively. Operation of Booster Circuit by Charge Pump Circuit FIG. 2 is a waveform chart showing the operation of the booster circuit constructed by the charge pump circuit illustrated in FIG. 1. As shown in the diagram, from an output of the first drive circuit Drv1 constructed by the inverter Inv1, level shifting circuit LSC, and inverter Inv2, the drive input signal VDHS for driving the gate G of the N-channel MOSFET of the first transistor Q11 as a high-side switch for precharge and the gate G of the P-channel MOSFET of the fourth transistor Q14 as a low-side switch for driving output in response to the clock signal CLK is generated. The high level and the low level of the drive input signal VDHS from the output of the first drive circuit Drv1 are set to the level of the boosted output voltage Vout which becomes the double boost voltage 2 Vdd and the level of the input voltage Vdd, respectively. From an output of the second drive circuit Drv2 constructed by the inverters Inv1 and Inv2, the drive input signal VDLS for driving the gate G of the N-channel MOSFET of the second transistor Q12 as a low-side switch for precharge and the gate G of the P-channel MOSFET of the third transistor Q13 as a high-side switch for driving output in response to the clock signal CLK is generated. The high level and the low level of the drive input signal VDLS from the output of the second drive circuit Drv2 are set to the level of the input voltage Vdd and the level of the ground voltage Vss as the base potential, respectively.

On the other hand, the input voltage Vdd is supplied to the P-type well P-Well of the N-channel MOSFET of the first transistor Q11 as a high-side switch for precharge. Therefore, as shown in FIG. 2, the N-channel MOSFET of the first transistor Q11 is reliably controlled to be on/off in accordance with the high/low level of the drive input signal VDHS set to the level of the boosted output voltage Vout which becomes the double boost voltage 2 Vdd and the level of the input voltage Vdd.

The boosted output voltage Vout which becomes the double boost voltage 2 Vdd is supplied to the N-type well N-Well in the P-channel MOSFET of the fourth transistor Q14 as a low-side switch for driving output. Therefore, as shown in FIG. 2, the P-channel MOSFET of the fourth transistor Q14 is reliably controlled to be on/off in accordance with the high/low level of the drive input signal VDHS set to the level of the boosted output voltage Vout which becomes the double boost voltage 2 Vdd and the input voltage Vdd.

The ground voltage Vss as the base potential is supplied to the P-type well P-Well of the N-channel MOSFET of the second transistor Q12 as a low-side switch for precharge. Therefore, as shown in FIG. 2, the N-channel MOSFET of the second transistor Q12 is reliably controlled to be on/off in accordance with the high/low level of the drive input signal VDLS set to the input voltage Vdd and the ground voltage Vss as the base potential.

The input voltage Vdd is supplied to the N-type well N-Well of the P-channel MOSFET of the third transistor Q13 as a high-side switch for driving output. Therefore, as shown in FIG. 2, the P-channel MOSFET of the third transistor Q13 is reliably controlled to be on/off in accordance with the high/low level of the drive input signal VDLS set to the input voltage Vdd and the ground voltage Vss as the base potential.

As a result, as shown in FIG. 2, in the precharge period in which the clock signal CLK is at the high level, the capacitor C1 can be charged with the precharge current Ip flowing in the N-channel MOSFET of the second transistor Q12 as a low-side switch for precharge which is turned on by the high level of the drive input signal VDLS from the N-channel MOSFET of the first transistor Q11 as a high-side switch for precharge which is turned on by the high level of the drive input signal VDHS.

In the output driving period in which the clock signal CLK is at the low level, the output drive current Id can be supplied to an output capacitor C2 of the output terminal from the input voltage Vdd via the P-channel MOSFET of the third transistor Q13 as a high-side switch for driving output which is turned on by the low level of the drive input signal VDLS, the capacitor C1, and the P-channel MOSFET of the fourth transistor Q14 as a low-side switch for driving output which is turned on by the low level of the drive input signal VDHS.

The parasitic diode D12 existing between the N-type drain D of the N-channel MOSFET of the second transistor Q12 as a low-side switch for precharge and the P-type well P-Well does not exert an adverse influence on the operation of the booster circuit constructed by the charge pump circuit shown in FIG. 1.

The parasitic diode D13 existing between the P-type drain D of the third transistor Q13 as a high-side switch for driving output and the N-type well N-Well does not exert an adverse influence on the operation of the booster circuit constructed by the charge pump circuit illustrated in FIG. 1.

Modification of First Transistor Q11 and Fourth Transistor Q14

Figure 3:
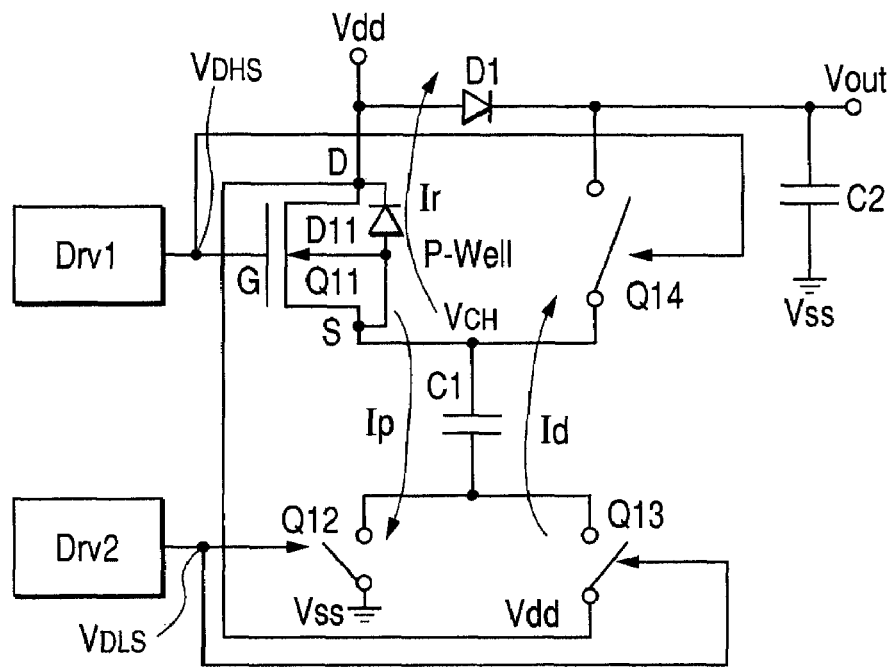
FIG. 3 is a diagram showing an example of the booster circuit constructed by a charge pump circuit shown in FIG. 1, in which a P-type well P-Well of an N-channel MOSFET of a first transistor Q11 as a high-side switch for precharge in FIG. 1 is connected to an N-type source S.

FIG. 3 is a diagram showing an example of the booster circuit constructed by a charge pump circuit shown in FIG. 1, in which a P-type well P-Well of an N-channel MOSFET of the first transistor Q11 as a high-side switch for precharge in FIG. 1 is connected to the N-type source S. The example of FIG. 3 has a drawback such that backward current Ir flows to the input voltage Vdd from one end VCH of the precharge capacitor C1 whose maximum charge voltage becomes the double boost voltage 2 Vdd of about 11 volts via the parasitic diode D11 existing between the P-type well P-Well of the N-channel MOSFET of the first transistor Q11 and the N-type drain D. Therefore, the booster circuit of the example of FIG. 3 is not practical.

Figure 4:
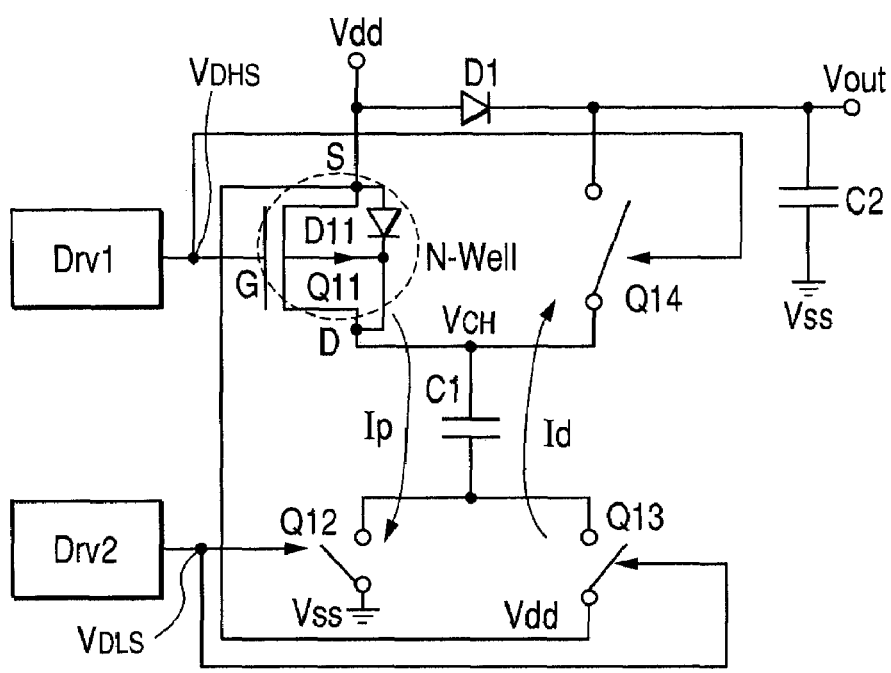
FIG. 4 is a diagram showing an example of the booster circuit constructed by a charge pump circuit shown in FIG. 1, in which an N-type well N-Well of a P-channel MOSFET of the first transistor Q11 as a high-side switch for precharge in FIG. 1 is connected to a P-type drain D.

FIG. 4 is a diagram showing an example of the booster circuit constructed by the charge pump circuit shown in FIG. 1, in which the N-type well N-Well of the P-channel MOSFET of the first transistor Q11 as a high-side switch for precharge in FIG. 1 is connected to the P-type drain D. In the example of FIG. 4, to reliably turn on the P-channel MOSFET of the first transistor Q11 in the precharge period in which the one end VCH of the precharge capacitor C1 becomes one-fold boost voltage Vdd, the low level of the drive input signal VDHS has to be set to the base voltage Vss (zero volt). On the other hand, in the example of FIG. 4, to reliably turn off the P-channel MOSFET of the first transistor Q11 in the output drive period in which the one end VCH of the precharge capacitor C1 becomes the double boost voltage 2 Vdd, the high level of the drive input signal VDHS has to be set to 2 Vdd. Consequently, the voltage amplitude of the drive input signal VDHS becomes 2 Vdd, so that a high-withstand voltage transistor, not a low-withstand voltage transistor, has to be used as the P-channel MOSFET of the first transistor Q11. Therefore, also in the example of FIG. 4, the booster circuit is not practical.

Figure 5:
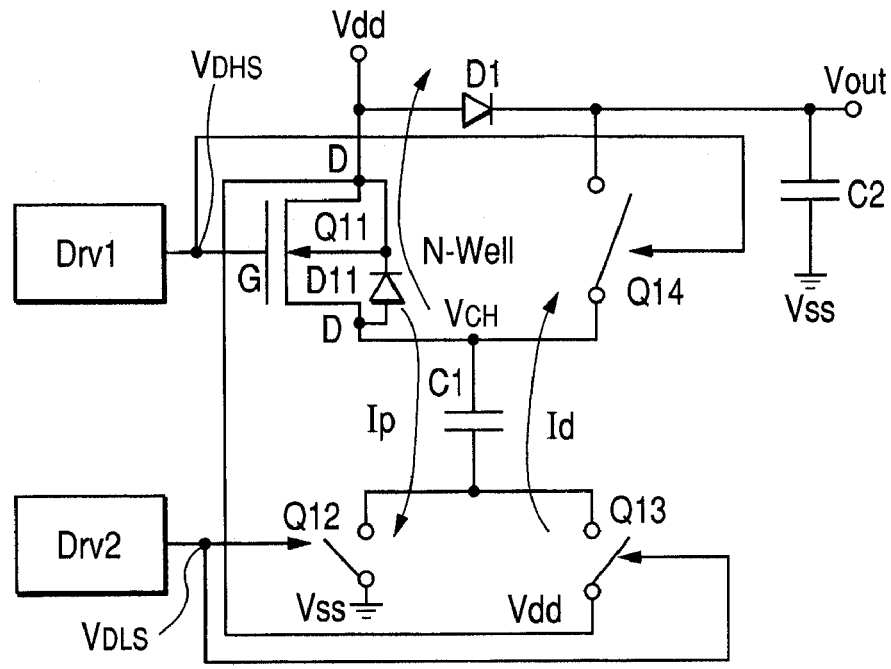
FIG. 5 is a diagram showing an example of the booster circuit constructed by a charge pump circuit shown in FIG. 1, in which the N-type well N-Well of the P-channel MOSFET of the first transistor Q11 as a high-side switch for precharge in FIG. 1 is connected to a P-type source S.

FIG. 5 is a diagram showing an example of the booster circuit constructed by the charge pump circuit shown in FIG. 1, in which the N-type well N-Well of the P-channel MOSFET of the first transistor Q11 as a high-side switch for precharge in FIG. 1 is connected to the P-type source S. The example of FIG. 5 has a drawback such that the backward current Ir flows to the input voltage Vdd from one end VCH of the precharge capacitor C1 whose maximum charge voltage becomes the double boost voltage 2 Vdd of about 11 volts via the parasitic diode D11 existing between the P-type drain D of the P-channel MOSFET of the first transistor Q11 and the N-type well N-Well. Therefore, the booster circuit of the example of FIG. 5 is not also practical.

Figure 6:
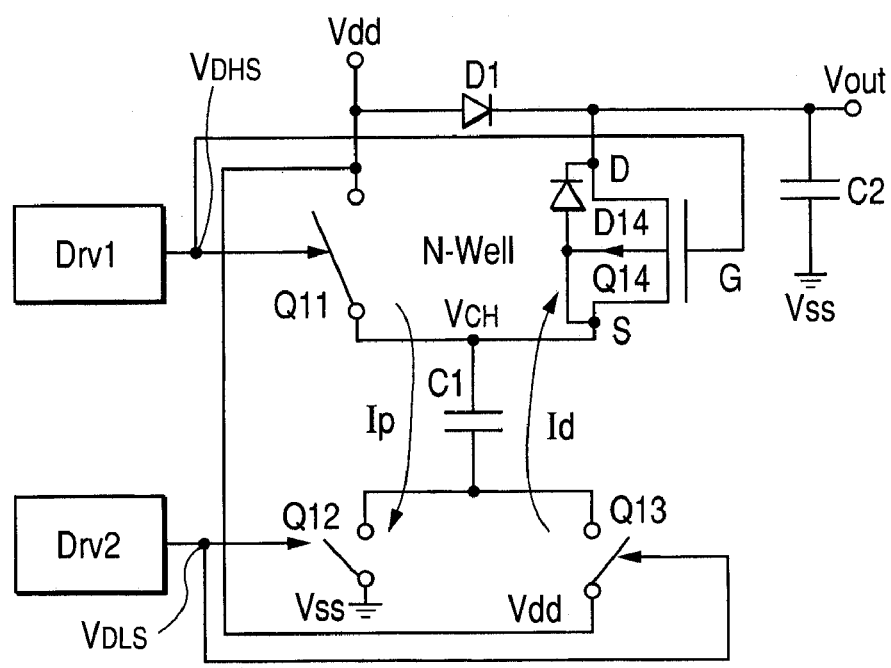
FIG. 6 is a diagram showing a modification of the present invention that, in the booster circuit constructed by a charge pump circuit shown in FIG. 1, an N-type well N-Well of a P-channel MOSFET of a fourth transistor Q14 as a low-side switch for driving output in FIG. 1 is connected to a P-type source S.

FIG. 6 is a diagram showing a modification of the present invention that, in the booster circuit constructed by the charge pump circuit shown in FIG. 1, the N-type well N-Well of the P-channel MOSFET of the fourth transistor Q14 as a low-side switch for driving output in FIG. 1 is connected to the P-type source S. In the modification of FIG. 6, to reliably turn on the P-channel MOSFET of the fourth transistor Q14 in the output drive period in which the one end VCH of the precharge capacitor C1 becomes the double boost voltage 2 Vdd, it is sufficient to set the low level of the drive input signal VDHS to Vdd. Then, the voltage amplitude of the drive input signal VDHS becomes Vdd, so that it is unnecessary to use a high-withstand voltage transistor but is sufficient to use a low-withstand voltage transistor as the P-channel MOSFET of the fourth transistor Q14. Therefore, in the modification of the invention of FIG. 6, the booster circuit is practical.

Figure 7:
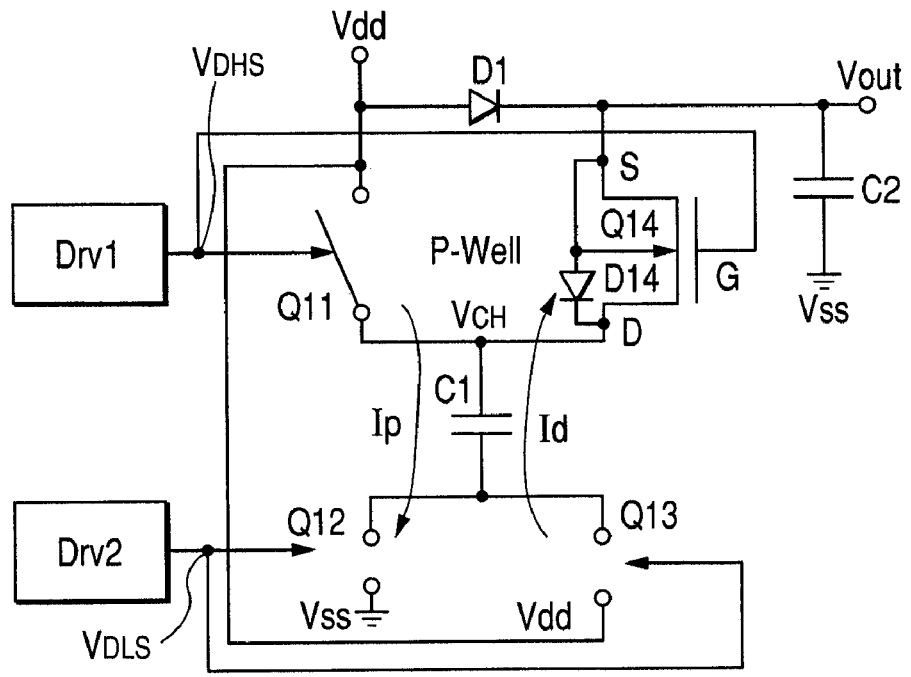
FIG. 7 is a diagram showing an example of the booster circuit constructed by a charge pump circuit shown in FIG. 1, in which a P-type well P-Well of an N-channel MOSFET of the fourth transistor Q14 as a low-side switch for driving output in FIG. 1 is connected to an N-type source S.

FIG. 7 is a diagram showing an example of the booster circuit constructed by the charge pump circuit shown in FIG. 1, in which the P-type well P-Well of the N-channel MOSFET of the fourth transistor Q14 as a low-side switch for driving output in FIG. 1 is connected to the N-type source S. The gate threshold voltage of the fourth transistor Q14 as a low-side switch for driving output is set as Vthn. In the example of FIG. 7, to reliably turn on the P-channel MOSFET of the fourth transistor Q14 during the output drive period in which the boosted output voltage Vout becomes the double boost voltage 2 Vdd, the high level of the drive input signal VDHS has to be set to 2 Vdd+Vtpn. However, as shown in FIG. 1, the high level of the drive input signal VDHS from an output of the first drive circuit Drv1 for driving the gate G of the fourth transistor Q14 as a low-side switch for driving output is set as the level of the boosted output voltage Vout which becomes the double boost voltage 2 Vdd. Consequently, the P-channel MOSFET of the fourth transistor Q14 cannot be controlled to be on. To turn on the P-channel MOSFET of the fourth transistor Q14, the first drive circuit Drv1 is constructed by a bootstrap circuit for generating an output voltage whose high level is set to the high level of the drive input signal VDHS which is higher than the double boost voltage 2 Vdd. However, since the bootstrap circuit requires a bootstrap capacitor charged during the precharge period, so that the chip occupying area of the booster circuit increases due to the bootstrap capacitor. Therefore, the booster circuit in the example of FIG. 7 is not also practical.

Figure 8:
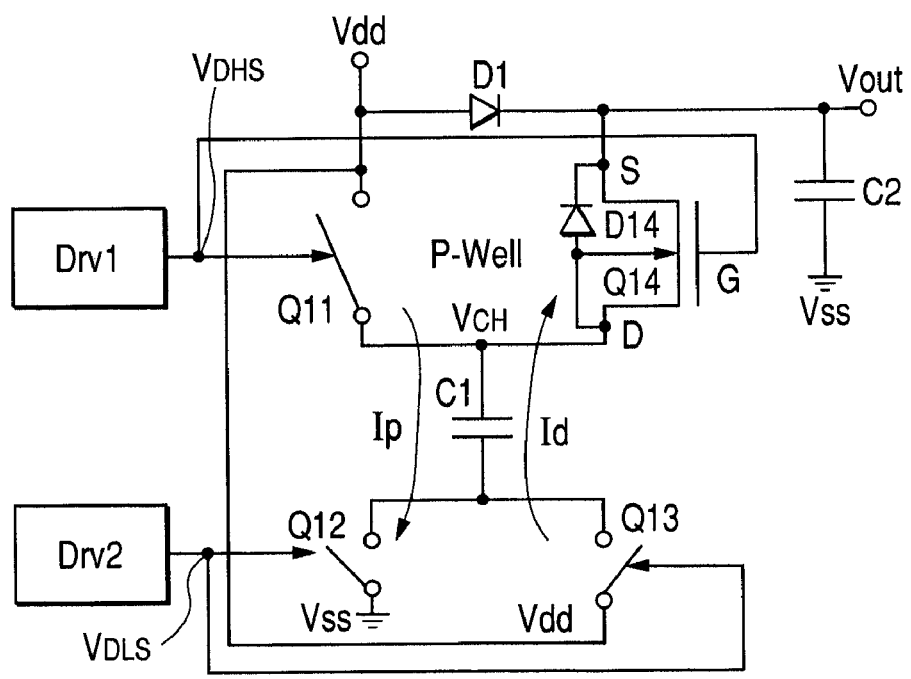
FIG. 8 is a diagram showing an example of the booster circuit constructed by a charge pump circuit shown in FIG. 1, in which the P-type well P-Well of an N-channel MOSFET of the fourth transistor Q14 as a low-side switch for driving output in FIG. 1 is connected to an N-type drain D.

FIG. 8 is a diagram showing an example of the booster circuit constructed by the charge pump circuit shown in FIG. 1, in which the P-type well P-Well of the N-channel MOSFET of the fourth transistor Q14 as a low-side switch for driving output in FIG. 1 is connected to the N-type drain D. Also in the example of FIG. 8, in a manner similar to the example of FIG. 7, to reliably turn on the P-channel MOSFET of the fourth transistor Q14 during the output drive period in which the one end VCH of the precharge capacitor C1 becomes the double boost voltage 2 Vdd, the high level of the drive input signal VDHS has to be set to 2 Vdd+Vtpn. Therefore, in a manner similar to FIG. 7, the first drive circuit Drv1 has to be constructed by a bootstrap circuit, and the booster circuit in the example of FIG. 8 is not also practical.

On the other hand, the second transistor Q12 as a low-side switch for precharge in the booster circuit of FIG. 1 and the third transistor Q13 as a high-side switch for driving output operate as a voltage pull-down device and a voltage pull-up device, respectively. There is no option of the second transistor Q12 as a voltage pull-down device except for the N-channel MOSFET in which the P-type well P-Well is connected to the N-type source S as shown in FIG. 1. Similarly, there is no option of the third transistor Q13 as a voltage pull-up device except for the P-channel MOSFET in which the N-type well N-Well is connected to the P-type source S as shown in FIG. 1.

Booster Circuits According to Other Embodiments

Figure 9:
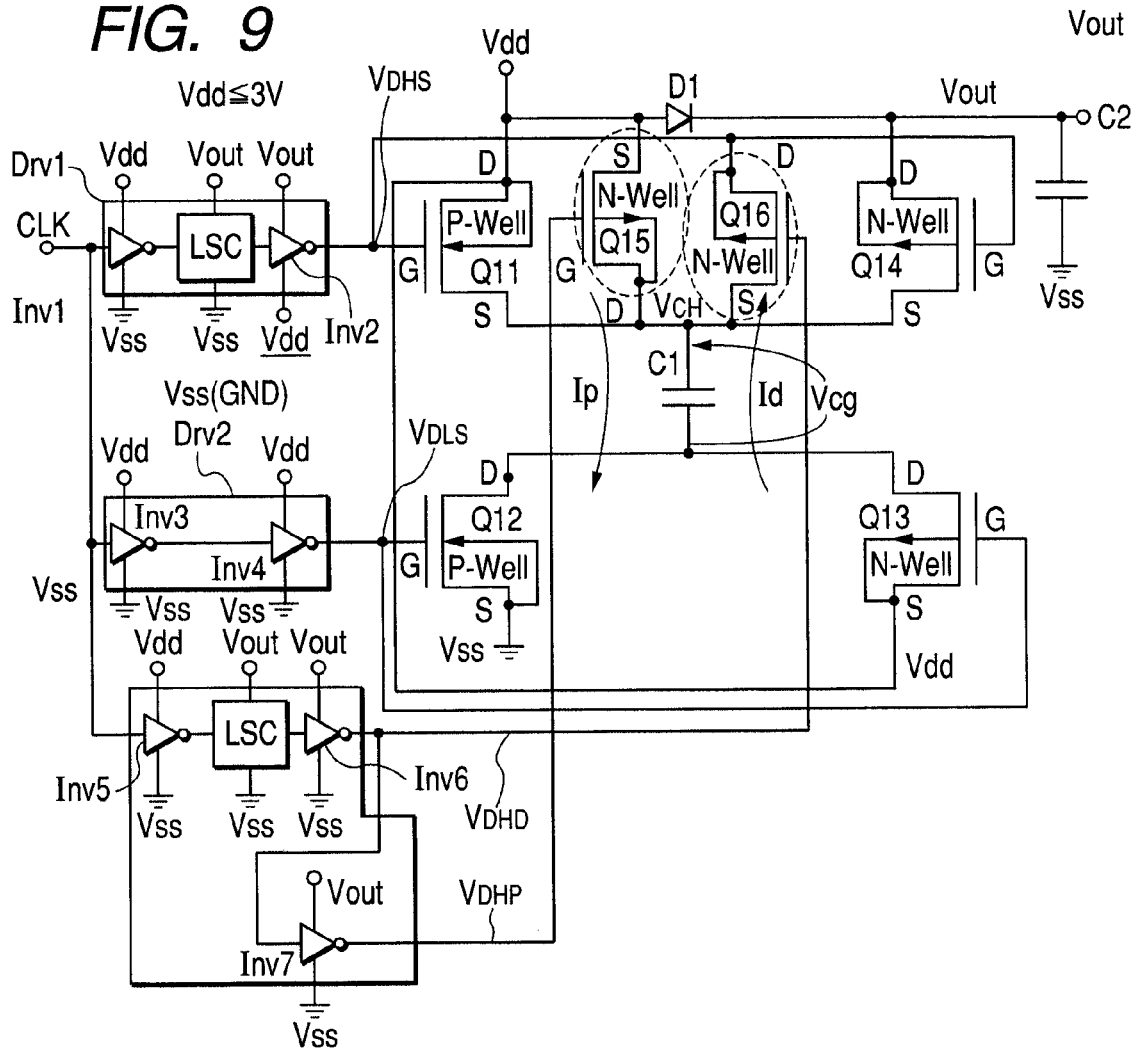
FIG. 9 is a diagram showing the configuration of a booster circuit constructed by a charge pump circuit provided on the chip of a semiconductor integrated circuit according to another embodiment of the invention.

FIG. 9 is a diagram showing the configuration of a booster circuit constructed by a charge pump circuit provided on the chip of a semiconductor integrated circuit according to another embodiment of the invention.

The points of the embodiment of FIG. 9 different from FIG. 1 will be described below. As shown in the diagram, a fifth transistor Q15 as a first auxiliary switch and a sixth transistor Q16 as a second auxiliary switch are added to the booster circuit shown in FIG. 1. Specifically, in the booster circuit constructed by a charge pump circuit in the semiconductor integrated circuit shown in FIG. 9, the fifth transistor Q15 as a first auxiliary switch is connected between the input voltage Vdd and one end of the capacitor C1, and the sixth transistor Q16 as a second auxiliary switch is connected between the one end of the capacitor C1 and an output terminal for outputting the boosted output voltage Vout. The fifth transistor Q15 as the first auxiliary switch is constructed by a P-channel MOS transistor in which the input voltage Vdd is supplied to the P-type source S, and the N-type well N-Well and the P-type drain D are connected to one end VCH of the capacitor C1. The sixth transistor Q16 as the second auxiliary switch is also constructed by a P-channel MOS transistor in which the P-type source S is connected to the one end VCH of the capacitor C1, and the N-type well N-Well and the P-type drain D are connected to the output capacitor C2 of the output terminal from which the boosted voltage Vout is output. Drive input signals VDHP and VDHD for driving the gate G of the fifth transistor Q15 as the first auxiliary switch and the gate G of the sixth transistor Q16 as the second auxiliary switch are generated from two output terminals of a third drive circuit Drv3.

Figure 10:
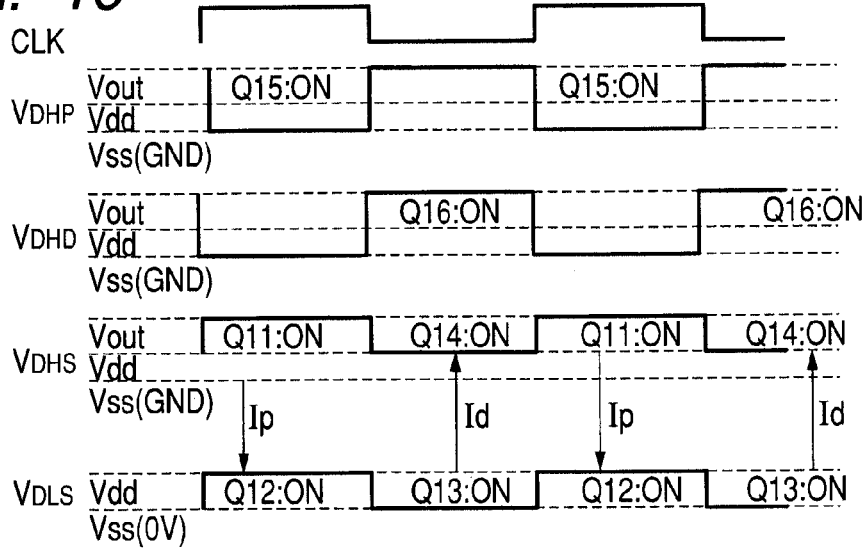
FIG. 10 is a waveform chart for explaining the operation of the booster circuit shown in FIG. 9.

As shown in FIG. 10, the high level and the low level of the drive input signals VDHP and VDHD for driving the input terminal of the fifth transistor Q15 as the first auxiliary switch and the input terminal of the sixth transistor Q16 as the second auxiliary switch in response to the clock signal CLK are set to the level of the boosted output voltage Vout and the level of the base potential Vss, respectively, output from the output terminal. Each of The fifth transistor Q15 as the first auxiliary switch and the sixth transistor Q16 as the second auxiliary switch has a transistor structure with a withstand voltage higher than that of any of the first transistor Q11, second transistor Q12, third transistor Q13, and fourth transistor Q14, and has a device size smaller than that of any of the transistors Q11 to Q14.

Figure 11:
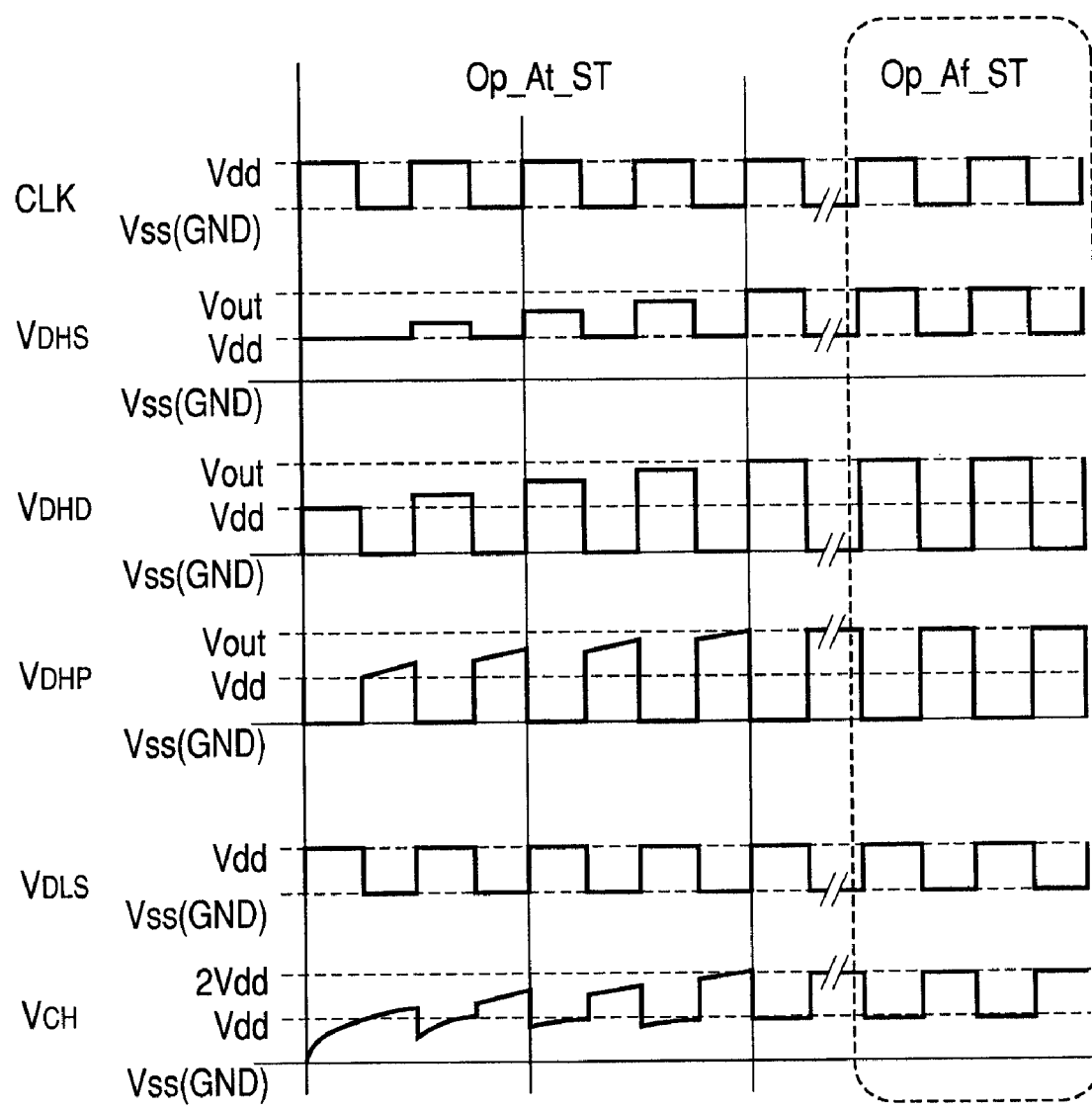
FIG. 11 is a waveform chart for explaining the operation of the booster circuit shown in FIG. 9.

The another embodiment of the invention shown in FIG. 9 is effective when the voltage amplitude of the drive input signal VDHS for driving the input terminal of the first transistor Q11 as a high-side switch for precharge and the input terminal of the fourth transistor Q14 as a low-side switch for driving output is not sufficiently large in the operation at the start Op_At_St immediately after start of supply of the clock signal CLK to the booster circuit by the charge pump circuit in FIG. 11. In the another embodiment of the invention shown in FIG. 9, as shown by the operation of Op_At_St immediately after start of supply of the clock signal CLK in FIG. 11, when the voltage amplitude of the drive input signal VDHS whose low level is set to the input voltage Vdd is not sufficiently large, the voltage amplitude of each of the drive input signals VDHP and VDHD whose low level is set to the base voltage Vss is already sufficiently large. Therefore, the fifth transistor Q15 as the first auxiliary switch and the sixth transistor Q16 as the second auxiliary switch can execute on/off operation sufficiently. In the precharge period at the time of start Op_At_St, by turning on the fifth transistor Q15 as the first auxiliary switch and the sixth transistor Q16 as the second auxiliary switch, the capacitor C1 is charged with the charging voltage Vcg of the input voltage Vdd. In the output drive period at the time of start Op_At_St, by turning on the third transistor Q13 as a high-side switch for driving output and the sixth transistor Q16 as the second auxiliary switch, the boosted output voltage Vout obtained by adding the charging voltage Vcg of the capacitor C1 to the input voltage Vdd is output from the output terminal. After that, when the voltage amplitude of the drive input signal VDHS becomes sufficiently large as shown by stationary operation Op_Af_St after start of FIG. 11, the first transistor Q11 as a high-side switch for precharge and the fourth transistor Q14 as a low-side switch for driving output are turned on. The switching operation of the first, second, third, and fourth transistors Q11, Q12, Q13, and Q14 having large device size can be realized, and the booster circuit constructed by the charge pump circuit starts the operation in the mode of heavy load driving capability. The stationary operation Op_Af_St after start shown in FIG. 11 corresponds to the operation waveform of FIG. 10.

Figure 12:
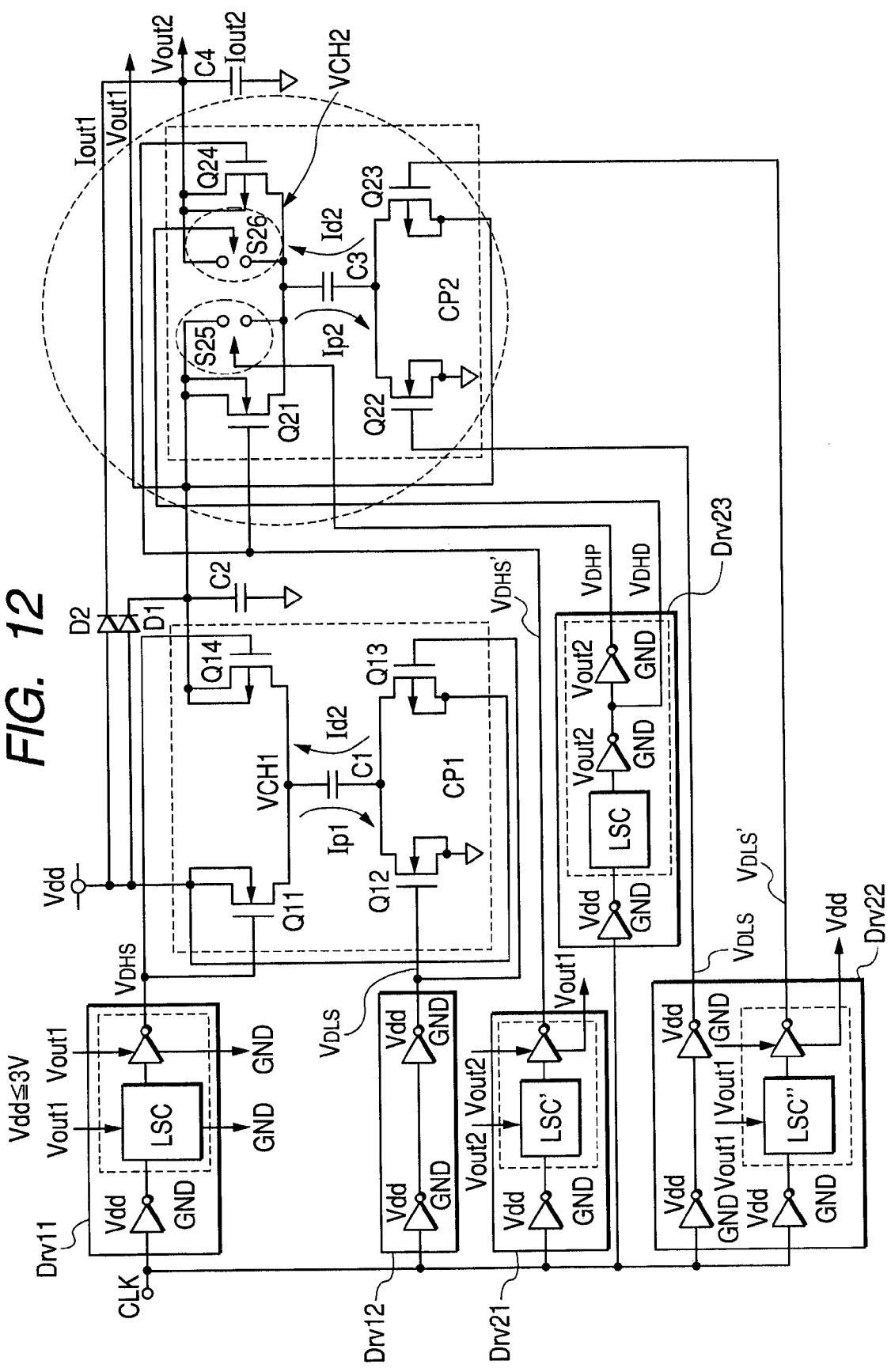
FIG. 12 is a diagram showing the configuration of a booster circuit constructed by a charge pump circuit provided on the chip of a semiconductor integrated circuit according to further another embodiment of the invention.

FIG. 12 is a diagram showing the configuration of the booster circuit constructed by the charge pump circuit provided on the chip of a semiconductor integrated circuit according to further another embodiment of the invention.

In the diagram, the booster circuit is constructed by cascaded charge pump circuits CP1 and CP2 in multiple stages. The input voltage Vdd of 3 volts or less is supplied to the charge pump circuit CP1 at the ante-stage, and the output voltage Vout which is the double boost voltage 2 Vdd is output from the charge pump circuit CP1 at the ante-stage. The output voltage Vout1 (=2 Vdd) from the charge pump circuit CP1 at the ante-stage is supplied to the charge pump circuit CP2 at the post-stage, and the output voltage Vout2 (=4 Vdd) which is the double boost voltage 2 Vout1 is output from the charge pump circuit CP2 at the post-stage. Since the charge pump circuit CP1 at the ante-stage operates on the output voltage Vout1 which is the double boost voltage 2 Vdd of 6 volts or less, the four transistors Q11, Q12, Q13, and Q14 constructing the charge pump circuit CP1 at the ante-stage are constructed by low-withstand-voltage transistors. A method of driving the input terminals of the four transistors Q11, Q12, Q13, and Q14 constructing the charge pump circuit CP1 at the ante-stage by driving circuits Drv11 and Drv12 is a general method as shown by waveforms VDHS and VDLS of FIG. 13. However, since the charge pump circuit CP2 at the post-stage operates on the output voltage Vout2 which is 4-fold boost voltage 4 Vdd of 12 volts, it is devised so that four transistors Q21, Q22, Q23, and Q24 constructing the charge pump circuit CP2 at the post stage by low-withstand-voltage transistors. Specifically, a method of driving the input terminals of the four transistors Q21, Q22, Q23, and Q24 constructing the charge pump circuit CP2 at the post stage by the first and second drive circuits Drv21 and Drv22 is devised as shown by waveforms VDHS' and VDLS' of the stationary operation Op_Af_St of FIG. 13. As shown by the waveform VDHS' of the stationary operation Op_Af_St of FIG. 13, the high level and the low level of the drive input signal VDHS' of the input terminals of the transistors Q21 and Q24 are set to the level of the output voltage Vout2 of the 4-fold boost voltage 4 Vdd and the level of the output voltage Vout1 of the double boost voltage 2 Vdd, respectively. Therefore, the voltage amplitude of the drive input signal VDHS' of the input terminals of the transistors Q21 and Q24 of the charge pump circuit CP2 at the post stage for outputting the output voltage Vout2 which is the 4-fold boost voltage 4 Vdd corresponds to the double boost voltage 2 Vdd, and the transistors Q21 and Q24 can be constructed by low-withstand-voltage transistors. Thus, the operation principle of the input driving of the transistors Q21 and Q24 of the charge pump circuit CP2 shown in FIG. 12 is the same as that of the booster circuits shown in FIGS. 1 and 9.

Figure 13:
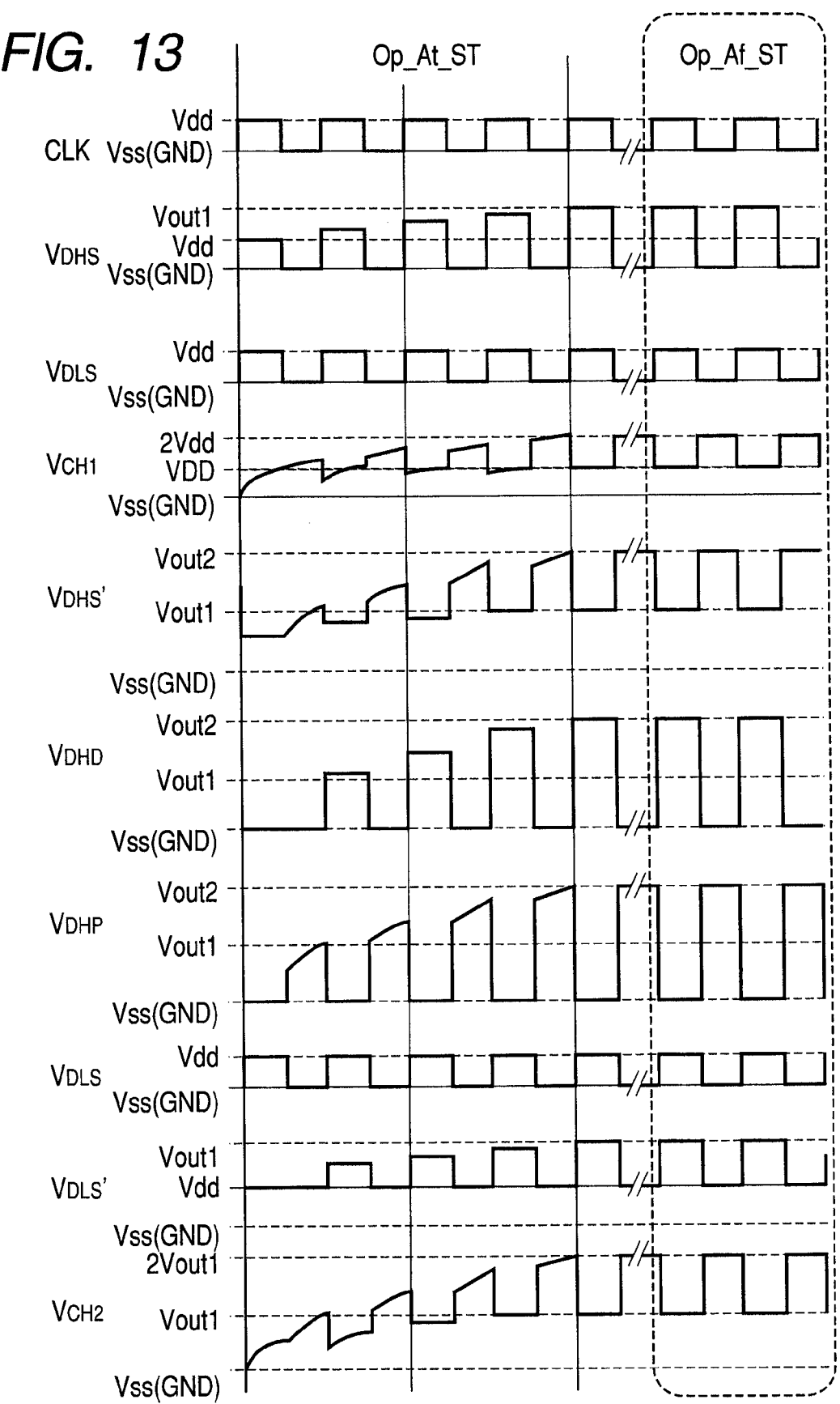
FIG. 13 is a waveform chart for explaining the operation of the booster circuit shown in FIG. 12.

A method of driving the input terminal of the transistor Q23 having a source to which the output voltage Vout1 of the double boost voltage 2 Vdd from the charge pump circuit CP1 at the ante-stage is supplied in the charge pump circuit CP2 at the post stage in FIG. 12 is devised as shown by the waveform VDLS' of the stationary operation Op_Af_St of FIG. 13. As shown by the waveform VDLS' of the stationary operation Op_Af_St of FIG. 13, the high level and the low level of the drive input signal VDLS' of the transistor Q23 generated from the output of the second drive circuit Drv2 are set to the level of the output voltage Vout1 of the double boost voltage 2 Vdd and the level of the input voltage Vdd, respectively. Therefore, the transistor Q23 can be constructed by a low-withstand-voltage transistor. A first auxiliary switch S25 and a second auxiliary switch S26 of the charge pump circuit CP2 at the post stage shown in FIG. 12 are constructed by high-withstand-voltage transistors like the fifth transistor Q15 as the first auxiliary switch and the sixth transistor Q16 as the second auxiliary switch shown in FIG. 9. It can be also understood from the voltage amplitude of the output voltage Vout2 of the 4-fold boost voltage 4 Vdd shown by the waveforms VDHP and VDHD of the stationary operation Op_Af_St in FIG. 13.

Figure 14:
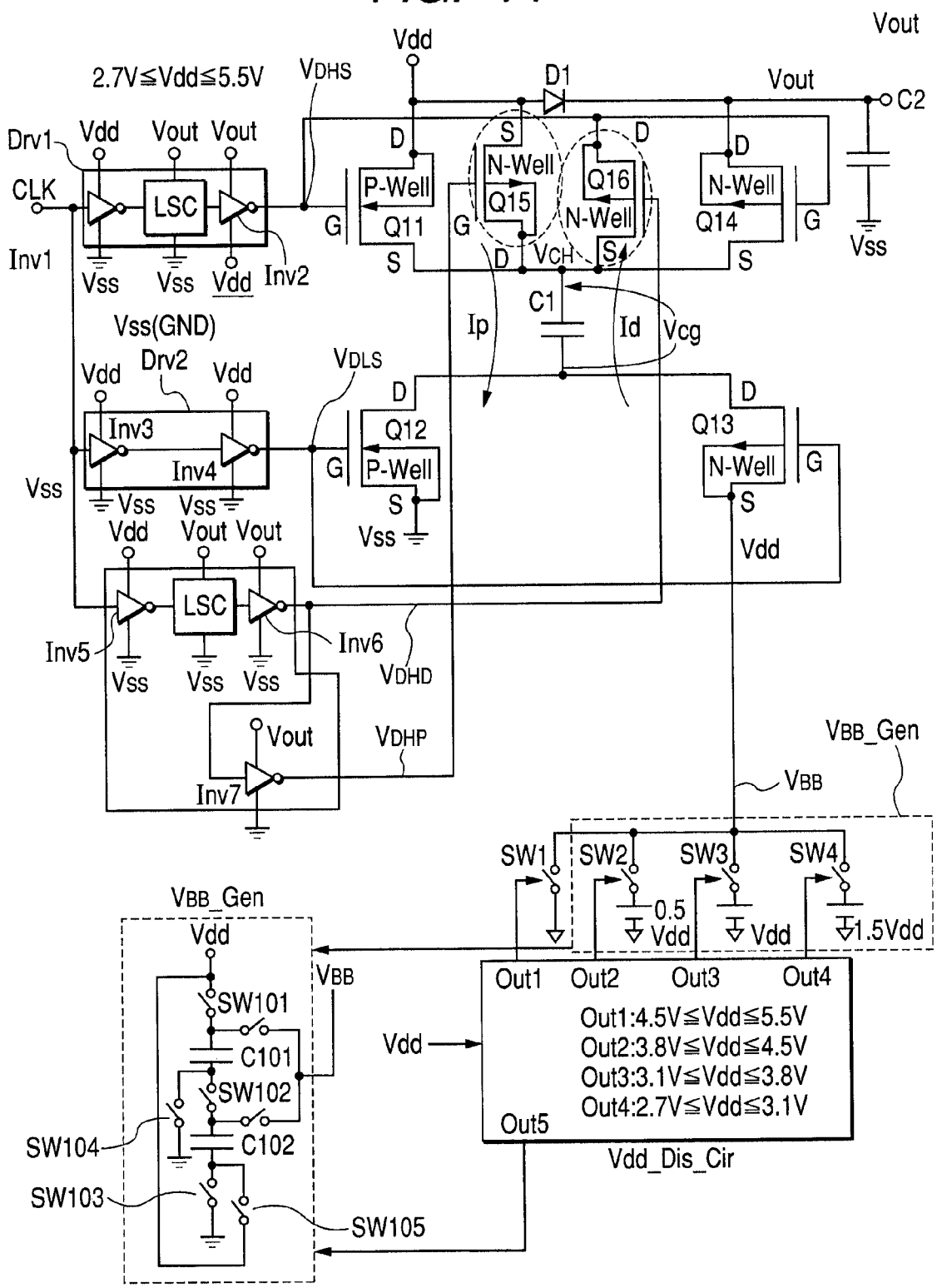
FIG. 14 is a diagram showing the configuration of a booster circuit constructed by a charge pump circuit provided on the chip of a semiconductor integrated circuit according to further another embodiment of the invention.

FIG. 14 is a diagram showing the configuration of a booster circuit constructed by the charge pump circuit provided on the chip of a semiconductor integrated circuit according to further another embodiment of the invention.

Figure 15:
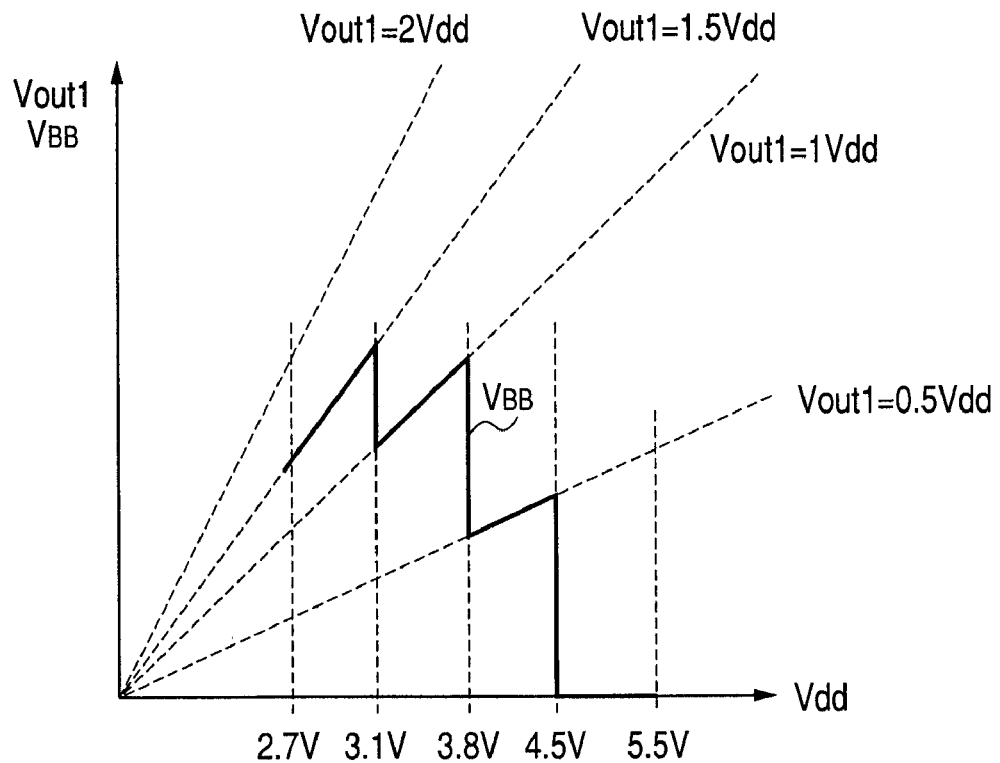
FIG. 15 is a characteristic diagram for explaining the operation of the booster circuit shown in FIG. 14.
Figure 16:
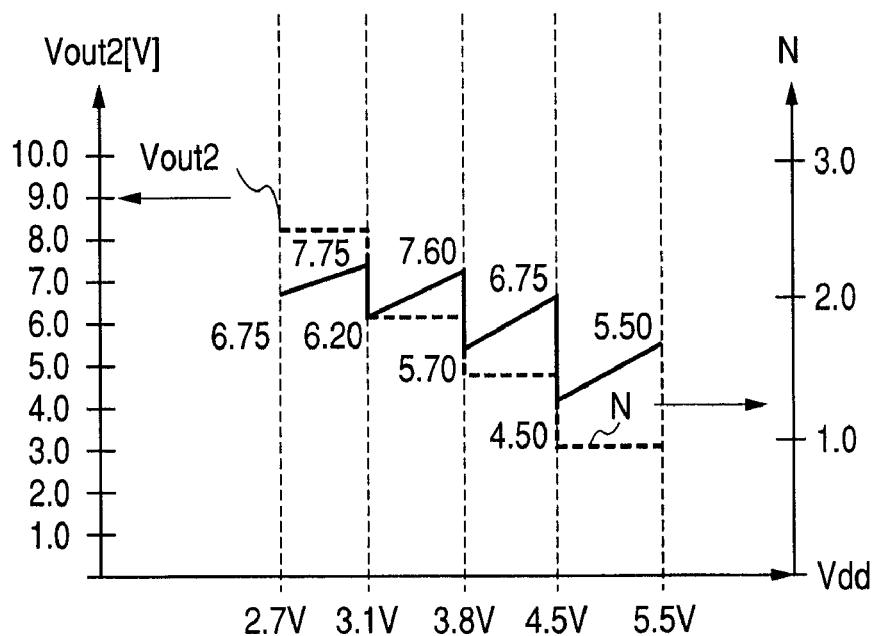
FIG. 16 is a characteristic diagram for explaining the operation of the booster circuit shown in FIG. 14.

The points of the embodiment of FIG. 14 different from the embodiment of FIG. 9 will be described below. It is assumed that the input voltage Vdd in the input range up to 3 volts is supplied to a booster circuit constructed by the charge pump circuit of FIG. 14. To the booster circuit constructed by the charge pump circuit of FIG. 14, an input voltage level detection circuit Vdd_Dis_Cir for detecting the level of the input voltage Vdd and a base voltage generating circuit VBB_Gen are connected. The base voltage generating circuit VBB_Gen is constructed by a plurality of switches SW1, SW2, SW3, and SW4 which are on/off controlled by a plurality of level detection output signals Out1, Out2, Out3, and Out4 of the input voltage level detection circuit Vdd_Dis_Cir, a voltage source 0.5 Vdd for generating a voltage 0.5 Vdd which is the half of the input voltage, a voltage source Vdd for generating a voltage Vdd which is the same as the input voltage, and a voltage source 1.5 Vdd for generating a voltage 1.5 Vdd which is 1.5 times as large as the input voltage. When the input voltage Vdd is at the level from 2.7 volts to 3.1 volts, only the level detection output signal Out4 of the input voltage level detection circuit Vdd_Dis_Cir becomes the high level. Therefore, the switch SW4 is turned on, and the voltage 1.5 Vdd which is 1.5 times as large as the input voltage Vdd from the voltage source 1.5 Vdd is supplied as the base voltage VBB to the source of the transistor Q23 in the charge pump circuit CP2 at the post stage in FIG. 14. At this time, the input voltage Vdd is applied across both ends of the capacitor C1 in the charge pump circuit in the precharge period. Therefore, the charge pump circuit adds the base voltage VBB which is the voltage 1.5 Vdd of the source of the transistor Q23 to the input voltage Vdd. The output voltage Vout of the charge pump circuit at this time becomes the voltage 2.5 Vdd which is 2.5 times as large as the input voltage Vdd. Consequently, as shown in FIG. 15, when the input voltage Vdd is at the level from 2.7 volts to 3.1 volts, the base voltage VBB is 1.5 Vdd. As shown in FIG. 16, the boost rate N of the booster circuit of FIG. 14 as a whole is 2.5, and the final boost voltage Vout changes from 6.75 volts to 7.75 volts. When the input voltage Vdd is at a level from 3.1 volts to 3.8 volts, only the level detection output signal Out3 of the input voltage level detection circuit Vdd_Dis_Cir becomes the high level. Therefore, the switch SW3 is turned on, and the voltage Vdd which is the same as that of the input voltage Vdd from the voltage source Vdd is supplied as the base voltage VBB to the source of the transistor Q23 of the charge pump circuit CP2 at the post stage of FIG. 14. The output voltage Vout of the charge pump circuit at this time becomes the voltage 2.0 Vdd which is 2.5 times as high as the input voltage Vdd. Consequently, as shown in FIG. 15, when the input voltage Vdd is at the level from 3.1 volts to 3.8 volts, the base voltage VBB becomes 1 Vdd. As shown in FIG. 16, the boost rate N of the booster circuit of FIG. 14 as a whole is 2.0, and the final boost voltage Vout changes from 6.20 volts to 7.60 volts. When the input voltage Vdd is at a level from 3.8 volts to 4.5 volts, only the level detection output signal Out2 of the input voltage level detection circuit Vdd_Dis_Cir becomes the high level. Therefore, the switch SW2 is turned on, and the voltage 0.5 Vdd which is 0.5 time of the input voltage Vdd from the voltage source 0.5 Vdd is supplied as the base voltage VBB to the source of the transistor Q23 of the charge pump circuit of FIG. 14. As a result, the output voltage Vout of the charge pump circuit at this time becomes the voltage 1.5 Vdd which is 1.5 times as high as the input voltage Vdd. Consequently, as shown in FIG. 15, when the input voltage Vdd is at the level from 3.8 volts to 4.5 volts, the base voltage VBB is 0.5 Vdd. As shown in FIG. 16, the boost rate N of the booster circuit of FIG. 14 as a whole is 1.5, and the final boost voltage Vout changes from 5.70 volts to 6.75 volts. When the input voltage Vdd is at a level from 4.5 volts to 5.5 volts, only the level detection output signal Out1 of the input voltage level detection circuit Vdd_Dis_Cir becomes the high level. Therefore, the switch SW1 is turned on, and the base potential Vss as the ground voltage is supplied as the base voltage VBB to the source of the transistor Q23 of the charge pump circuit CP2 at the post stage of FIG. 14. The output voltage Vout of the charge pump circuit at this time becomes the voltage 1 Vdd which is the same as the input voltage Vdd. Consequently, as shown in FIG. 15, when the input voltage Vdd is at the level from 4.5 volts to 5.5 volts, the base voltage VBB becomes zero volt. As shown in FIG. 16, the boost rate N of the booster circuit of FIG. 14 as a whole is 2.0, and the final boost voltage Vout changes from 4.50 volts to 5.50 volts. According to the embodiment, even when the level of the input voltage Vdd before boost linearly increases, as shown in FIG. 16, the level of the final boost output voltage Vout from the charge pump circuit does not increase linearly. Although it fluctuates slightly, it has an almost constant saturation characteristic in the range from 4.50 volts to 7.75 volts. The base voltage generating circuit VBB_Gen is constructed by two capacitors C101 and C103 whose capacitance values are equal to each other and a plurality of switches SW101, SW102, SW103, SW104, and SW105 as shown in a right lower part of FIG. 14. When 1.5 Vdd is output as the base voltage VBB, first, the two capacitors C101 and C103 are charged with the input voltage Vdd. After that, the two capacitors C101 and C103 are connected in parallel to generate 0.5 Vdd. By turning on the switch SW105 connected to the input voltage Vdd to boost the two capacitors C101 and C103 connected in parallel with the input voltage Vdd, the base voltage VBB of 1.5 Vdd can be generated. When 1.0 Vdd is output as the base voltage VBB, the two capacitors C101 and C103 are always connected in parallel and the base voltage VBB of 1.0 Vdd can be generated. When 0.5 Vdd is output as the base voltage VBB, first, the two capacitors C101 and C103 are charged with the input voltage Vdd. After that, by connecting the two capacitors C101 and C103 in parallel, the base voltage VBB of 0.5 Vdd can be generated.

Figure 17:
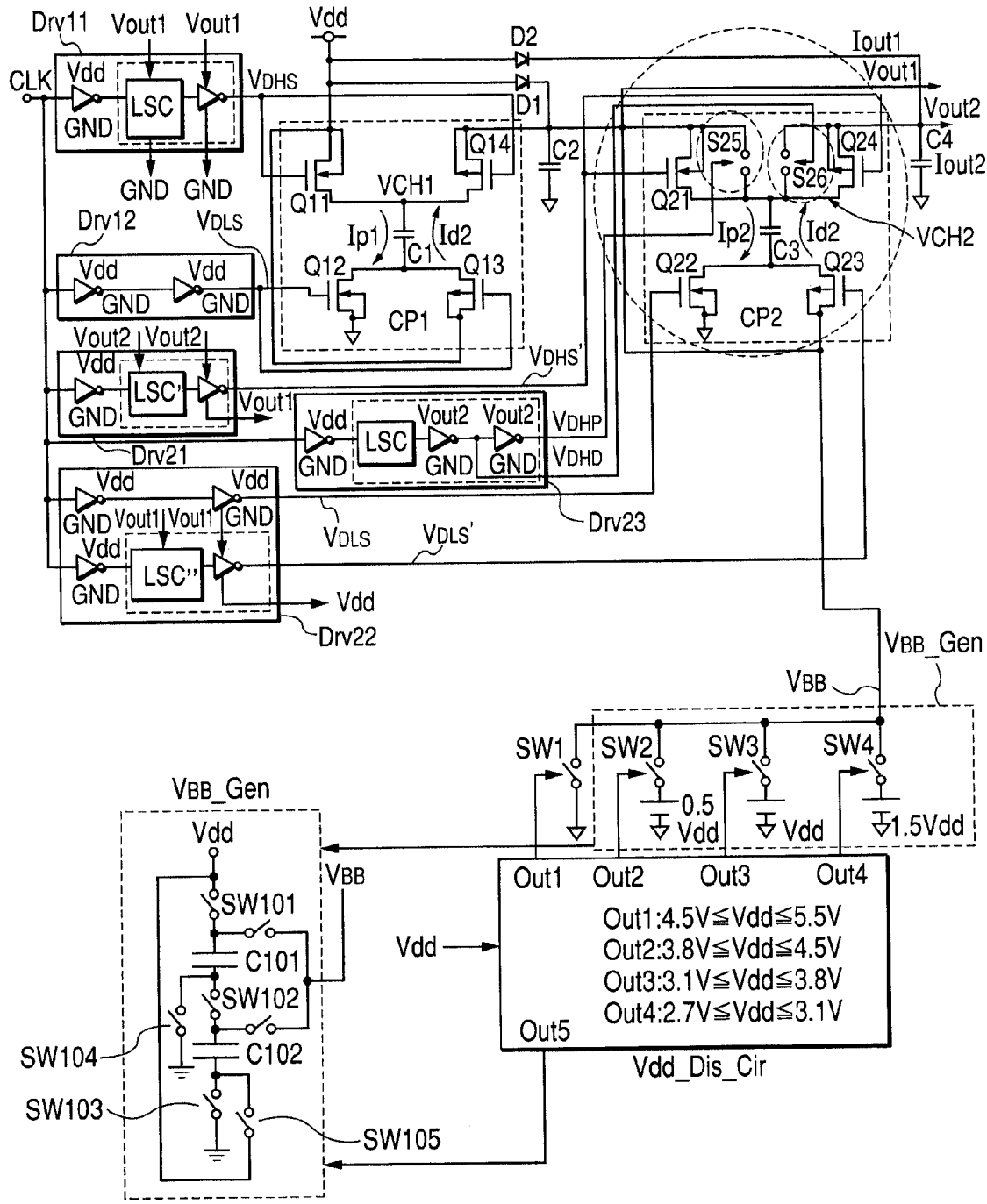
FIG. 17 is a diagram showing the configuration of a booster circuit constructed by a charge pump circuit provided on the chip of a semiconductor integrated circuit according to further another embodiment of the invention.

FIG. 17 is a diagram showing the configuration of a booster circuit constructed by a charge pump circuit provided on the chip of a semiconductor integrated circuit according to further another embodiment of the invention.

Figure 18:
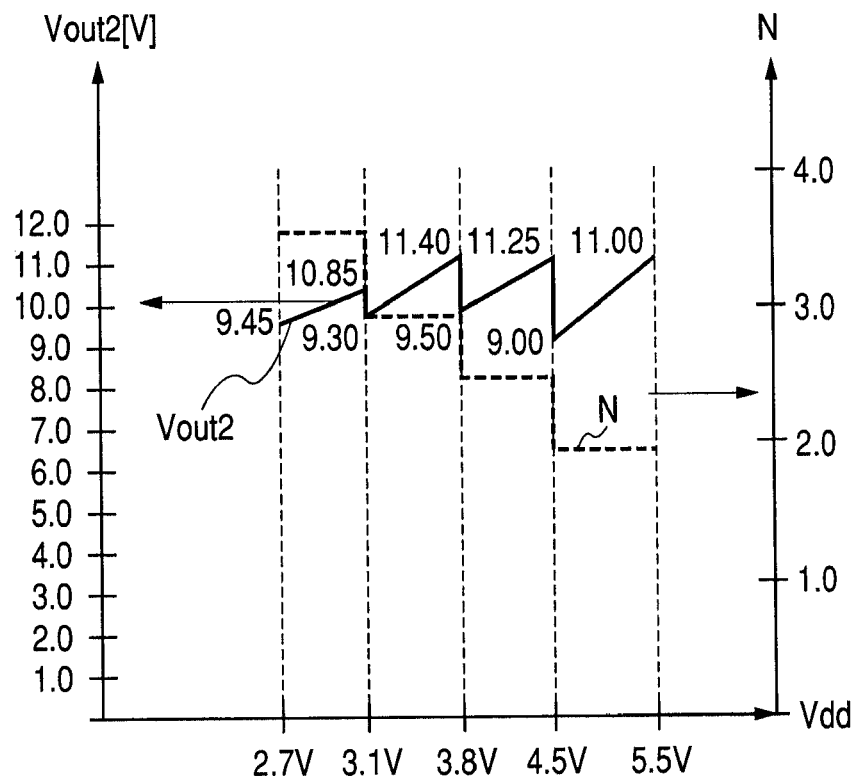
FIG. 18 is a characteristic diagram for explaining the operation of the booster circuit shown in FIG. 17.

The points of the embodiment of FIG. 17 different from the embodiment of FIG. 12 will be described below. It is assumed that the input voltage Vdd in the input range from 2.7 volts to 5.5 volts is supplied to a booster circuit constructed by the charge pump circuit of FIG. 14. To the booster circuit constructed by the charge pump circuit of FIG. 14, the input voltage level detection circuit Vdd_Dis_Cir for detecting the level of the input voltage Vdd and the base voltage generating circuit VBB_Gen are connected. The base voltage generating circuit VBB_Gen is constructed by the plurality of switches SW1, SW2, SW3, and SW4 which are on/off controlled by the plurality of level detection output signals Out1, Out2, Out3, and Out4 of the input voltage level detection circuit Vdd_Dis_Cir, the voltage source 0.5 Vdd for generating the voltage 0.5 Vdd which is the half of the input voltage, the voltage source Vdd for generating the voltage Vdd which is the same as the input voltage, and the voltage source 1.5 Vdd for generating the voltage 1.5 Vdd which is 1.5 times as large as the input voltage. When the input voltage Vdd is at the level from 2.7 volts to 3.1 volts, only the level detection output signal Out4 of the input voltage level detection circuit Vdd_Dis_Cir becomes the high level. Therefore, the switch SW4 is turned on, and the voltage 1.5 Vdd which is 1.5 times as high as the input voltage Vdd from the voltage source 1.5 Vdd is supplied as the base voltage VBB to the source of the transistor Q23 in the charge pump circuit CP2 at the post stage in FIG. 14. At this time, the double boost voltage 2 Vdd of the boost output Vout1 of the charge pump circuit CP1 at the ante stage is applied across both ends of the capacitor C3 in the charge pump circuit CP2 at the post stage. Therefore, the charge pump circuit CP2 at the post stage adds the base voltage VBB which is the voltage 1.5 Vdd of the source of the transistor Q23 to the double boost voltage 2 Vdd of the boost output Vout1 of the charge pump circuit CP1 at the ante stage. The output voltage Vout2 of the charge pump circuit CP2 at the post stage at this time becomes the voltage 3.5 Vdd which is 3.5 times as high as the input voltage Vdd. Consequently, as shown in FIG. 15, when the input voltage Vdd is at the level from 2.7 volts to 3.1 volts, the base voltage VBB is 1.5 Vdd. As shown in FIG. 18, the boost rate N of the booster circuit of FIG. 14 as a whole is 3.5, and the final boost voltage Vout2 changes from 9.45 volts to 10.85 volts. When the input voltage Vdd is at a level from 3.1 volts to 3.8 volts, only the level detection output signal Out3 of the input voltage level detection circuit Vdd_Dis_Cir becomes the high level. Therefore, the switch SW3 is turned on, and the voltage Vdd which is the same as that of the input voltage Vdd from the voltage source Vdd is supplied as the base voltage VBB to the source of the transistor Q23 of the charge pump circuit CP2 at the post stage of FIG. 14. The output voltage Vout 2 of the charge pump circuit at the post stage at this time becomes the voltage 3.0 Vdd which is 3.0 times as high as the input voltage Vdd. Consequently, as shown in FIG. 15, when the input voltage Vdd is at the level from 3.1 volts to 3.8 volts, the base voltage VBB becomes 1 Vdd. As shown in FIG. 18, the boost rate N of the booster circuit of FIG. 14 as a whole is 3.0, and the final boost voltage Vout2 changes from 9.30 volts to 1.14 volts. When the input voltage Vdd is at a level from 3.8 volts to 4.5 volts, only the level detection output signal Out2 of the input voltage level detection circuit Vdd_Dis_Cir becomes the high level. Therefore, the switch SW2 is turned on, and the voltage 0.5 Vdd which is 0.5 time of the input voltage Vdd from the voltage source 0.5 Vdd is supplied as the base voltage VBB to the source of the transistor Q23 of the charge pump circuit CP2 at the post stage of FIG. 14. As a result, the output voltage Vout2 of the charge pump circuit CP2 at the post stage at this time becomes the voltage 2.5 Vdd which is 2.5 times as high as the input voltage Vdd. Consequently, as shown in FIG. 15, when the input voltage Vdd is at the level from 3.8 volts to 4.5 volts, the base voltage VBB is 0.5 Vdd. As shown in FIG. 18, the boost rate N of the booster circuit of FIG. 14 as a whole is 2.5, and the final boost voltage Vout2 changes from 9.50 volts to 11.25 volts. When the input voltage Vdd is at a level from 4.5 volts to 5.5 volts, only the level detection output signal Out1 of the input voltage level detection circuit Vdd_Dis_Cir becomes the high level. Therefore, the switch SW1 is turned on, and the base potential Vss as the ground voltage is supplied as the base voltage VBB to the source of the transistor Q23 of the charge pump circuit CP2 at the post stage of FIG. 14. The output voltage Vout2 of the charge pump circuit CP2 at this time becomes the voltage 2.0 Vdd which is twice as high as the input voltage Vdd. Consequently, as shown in FIG. 15, when the input voltage Vdd is at the level from 4.5 volts to 5.5 volts, the base voltage VBB becomes zero volt. As shown in FIG. 18, the boost rate N of the booster circuit of FIG. 14 as a whole is 2.0, and the final boost voltage Vout2 changes from 9.00 volts to 11.00 volts. According to the embodiment, even when the level of the input voltage Vdd before boost linearly increases, as shown in FIG. 18, the level of the final boost output voltage Vout2 from the charge pump circuit CP2 at the post stage does not increase linearly. Although it fluctuates slightly, it has an almost constant saturation characteristic in the range from 9.00 volts to 11.40 volts. The base voltage generating circuit VBB_Gen of FIG. 17 is constructed by the two capacitors C101 and C103 whose capacitance values are equal to each other and the plurality of switches SW101, SW102, SW103, SW104, and SW105 in a manner similar to FIG. 14. When 1.5 Vdd is output as the base voltage VBB, first, the two capacitors C101 and C103 are charged with the input voltage Vdd. After that, the two capacitors C101 and C103 are connected in parallel to generate 0.5 Vdd. By turning on the switch SW105 connected to the input voltage Vdd to boost the two capacitors C101 and C103 connected in parallel with the input voltage Vdd, the base voltage VBB of 1.5 Vdd can be generated. When 1.0 Vdd is output as the base voltage VBB, the two capacitors C101 and C103 are always connected in parallel and the base voltage VBB of 1.0 Vdd can be generated. When 0.5 Vdd is output as the base voltage VBB, first, the two capacitors C101 and C103 are charged with the input voltage Vdd. After that, by connecting the two capacitors C101 and C103 in parallel, the base voltage VBB of 0.5 Vdd can be generated. The first auxiliary switch S25 and the second auxiliary switch S26 of the charge pump circuit CP2 at the post stage shown in FIG. 17 are constructed by high-withstand-voltage transistors like the fifth transistor Q15 as the first auxiliary switch and the sixth transistor Q16 as the second auxiliary switch shown in FIG. 9.

Figure 19:
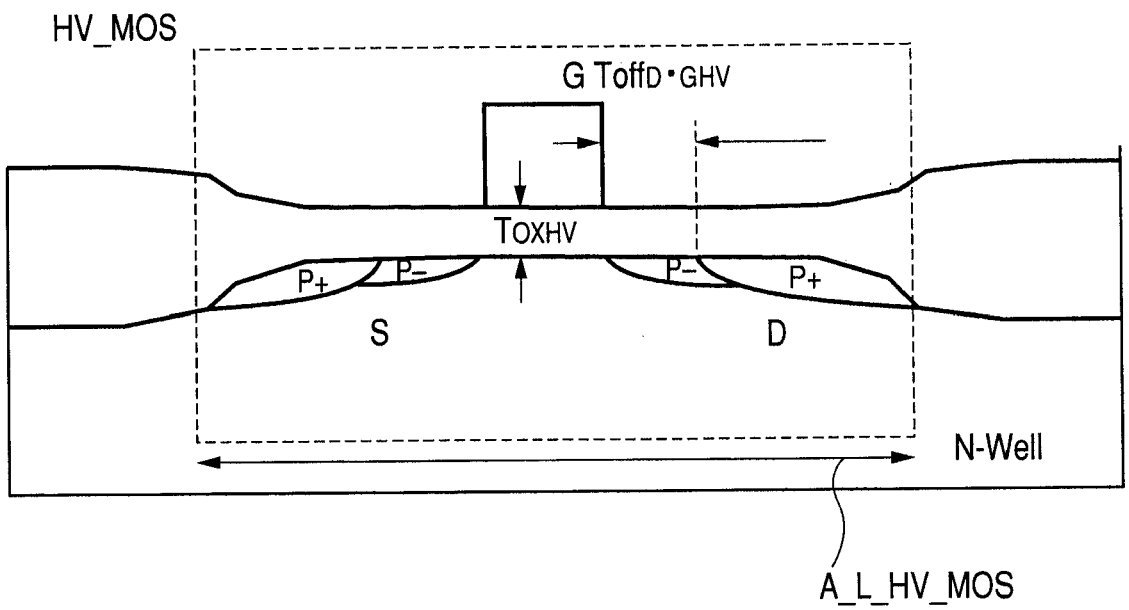
FIG. 19 is a diagram showing the structure of a MOS transistor as a high withstand voltage transistor serving as a fifth transistor Q15 as a first auxiliary switch and a sixth transistor Q16 as a second auxiliary switch illustrated in FIG. 9.

FIG. 19 shows the structure of a MOS transistor as a high withstand voltage transistor serving as the fifth transistor Q15 as a first auxiliary switch and the sixth transistor Q16 as a second auxiliary switch illustrated in FIG. 9. To realize the high withstand voltage MOS transistor, thickness TOXHV of a gate insulating film just below a gate electrode G is thinner than thickness TOXLV of a gate insulating film of a low-withstand-voltage MOS transistor described below. In the semiconductor substrate on both sides of the gate electrode G, a source region of low impurity concentration and a drain region of low impurity concentration are formed. On the outside of the source region of low impurity concentration and the drain region of low impurity concentration, a source region of high impurity concentration and a drain region of high impurity concentration are formed. In particular, between the right edge of the gate electrode G and the drain region of high impurity concentration, a drain-gate offset distance ToffDG•HV corresponding to the width of the drain region of low impurity concentration is assured. The drain-gate offset distance ToffDG•HV of the high-withstand-voltage MOS transistor is longer than a drain-gate offset distance ToffDG•LV of a low-withstand-voltage MOS transistor to be described below. As described above, the high-withstandvoltage MOS transistor of FIG. 19 has an LDD (Low Doped Drain) structure whose withstand voltage is increased by the existence of the drain region of low impurity concentration having the drain-gate offset distance ToffDG•HV. Although the high-withstand-voltage MOS transistor of FIG. 19 has a high-withstand-voltage characteristic, a source region of low impurity concentration is formed also on the source side for manufacturing reasons. As a result, source resistance becomes high, and mutual conductance Gm of the high-withstand-voltage MOS transistor of FIG. 19 becomes smaller than mutual conductance Gm of a low-withstand-voltage MOS transistor described below. Therefore, the high-withstand-voltage MOS transistor of FIG. 17 is not suitable as the MOS transistors Q11, Q12, Q13, and Q14 as low-withstand-voltage transistors shown in FIG. 1 requiring high current driving capability. To realize high current driving capability by the high-withstand-voltage MOS transistor of FIG. 19, the channel width of a MOS transistor as the width of the gate electrode G has to be set to an extremely large value.

Figure 20:
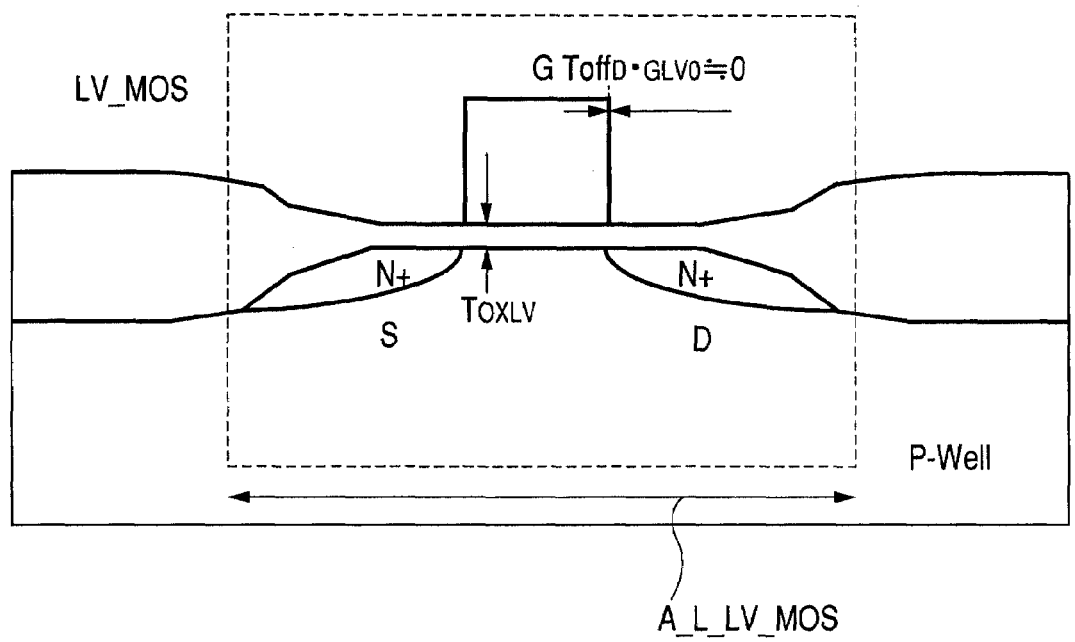
FIG. 20 is a diagram showing the structure of a MOS transistor as a low withstand voltage transistor having a proper high mutual conductance Gm with MOS transistors Q11, Q12, Q13, and Q14 as low withstand voltage transistors illustrated in the booster circuit of FIG. 1.

FIG. 20 shows the structure of a MOS transistor as a low withstand voltage transistor having a proper high mutual conductance Gm as the MOS transistors Q11, Q12, Q13, and Q14 as low withstand voltage transistors illustrated in the booster circuit of FIG. 1. In the low-withstand-voltage MOS transistor shown in FIG. 20, in the semiconductor substrate on both sides of the gate electrode G, a source region of low impurity concentration and a drain region of low impurity concentration are not formed. In the semiconductor substrate on both sides of the gate electrode G, a source region of high impurity concentration and a drain region of high impurity concentration are formed. The drain-gate offset distance ToffDG•LV in the low-withstand-voltage MOS transistor is close to zero. Thickness TOXLV of a gate insulating film of the low-withstand-voltage MOS transistor is smaller than thickness TOXHV of the gate insulating film of the high-withstand-voltage MOS transistor. As a result, high current driving capability of the MOS transistors Q11, Q12, Q13, and Q14 as low-withstand-voltage transistors shown in the booster circuit of FIG. 1 can be realized by the small channel width (the width of the gate electrode G) of the MOS transistor. Thus, the chip occupying area of the booster circuit can be largely reduced. It was confirmed by the inventors herein that the chip occupying area of the booster circuit in the case where the booster circuit is constructed by the low-withstand-voltage MOS transistor shown in FIG. 20 is largely reduced to 1/53 as compared with the case where the booster circuit of FIG. 1 is constructed by the high-withstand-voltage MOS transistor of FIG. 19 under the same current driving capability condition.

Figure 21:
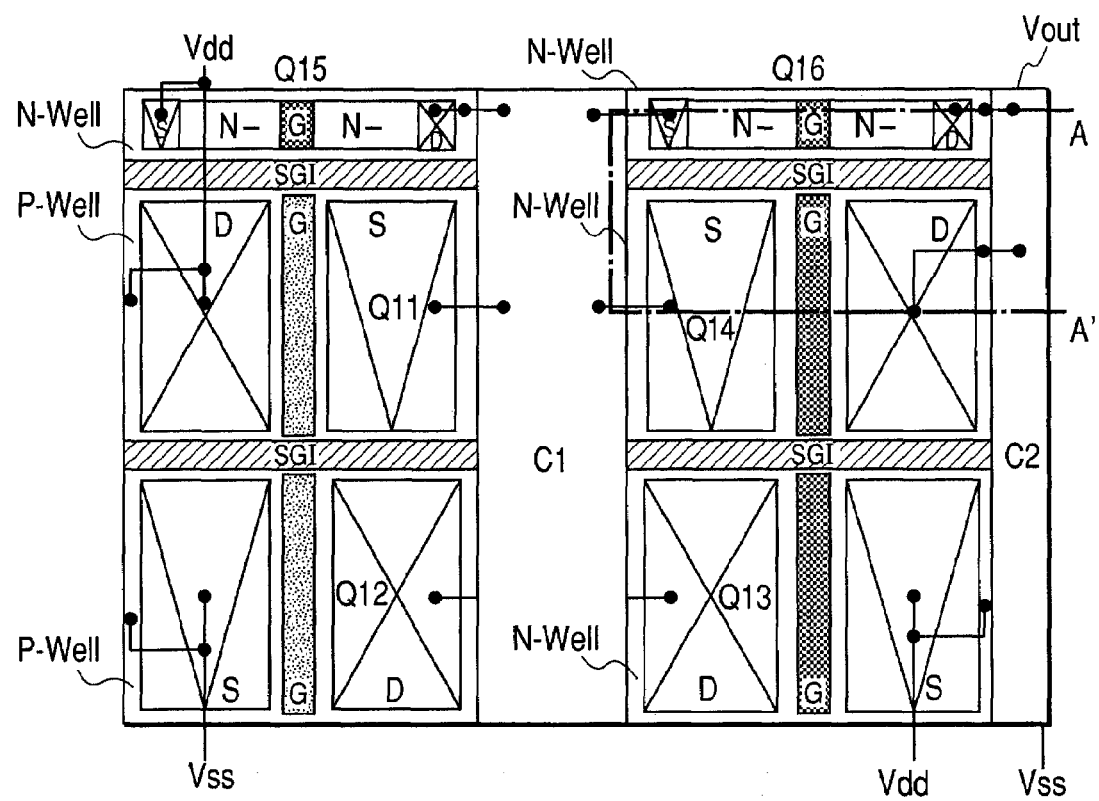
FIG. 21 is a plan view showing the layout in the case where a booster circuit including transistors Q11, Q12, Q13, Q14, Q15, and Q16 and two capacitors C1 and C2 illustrated in FIG. 9 is constructed on the chip of a semiconductor integrated circuit.

FIG. 21 is a plan view showing the layout in the case where the booster circuit including transistors Q11, Q12, Q13, Q14, Q15, and Q16 and the two capacitors C1 and C2 illustrated in FIG. 9 is constructed on the chip of a semiconductor integrated circuit. The transistors Q11, Q12, Q13, and Q14 shown in FIG. 21 are constructed by the low-withstand-voltage MOS transistors shown in FIG. 20, and the ratio W/L of channel width W and the channel length L is set to be high. That is, the width of the gate G of each of the transistors Q11, Q12, Q13, and Q14 is set to be large. The transistors Q15 and Q16 shown in FIG. 21 are constructed by the high-withstand-voltage MOS transistors of FIG. 19, and the ratio W/L of the channel width W and the channel length L is set to be low. That is, the width of the gate G of each of the transistors Q15 and Q16 is set to be small. In FIG. 21, SGI denotes regions of shallow groove isolation. By the SGI regions, two P-type well regions P-Well of the N-channel MOS transistors Q11 and Q12 are isolated from each other, and two N-type well regions N-Well in the P-channel MOS transistors Q13 and Q14 are electrically isolated from each other.

Figure 22:
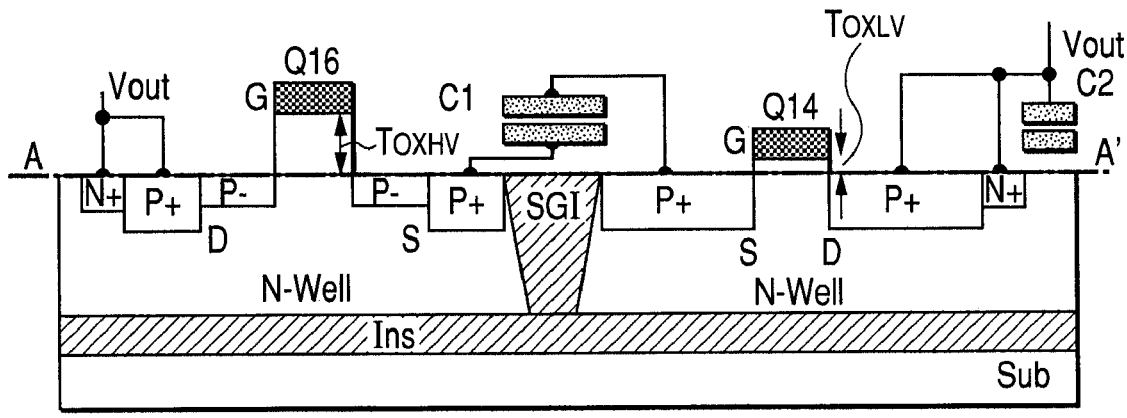
FIG. 22 is a cross section of a semiconductor chip taken along line A-A' of the plan view of FIG. 21.

FIG. 22 is a cross section of a semiconductor chip taken along line A-A' of the plan layout view of FIG. 21. In the diagram, the N-type well region N-Well in the P-channel MOS transistor Q16 and the N-type well region N-Well in the P-channel MOS transistor Q14 are formed via an insulating film Ins over a semiconductor substrate Sub. Between the two transistors Q16 and Q14, a capacitor C1 having an MIM (Metal-Insulating layer-Metal) structure is formed. To reduce stray capacitance, an SGI region is formed in the semiconductor layer below the capacitor C1. A capacitor C2 also has the MIM structure.

Although the present invention achieved by the inventors herein has been concretely described above on the basis of the embodiments, obviously, the invention is not limited to the embodiments but can be variously changed without departing from the gist.

Figure 23:
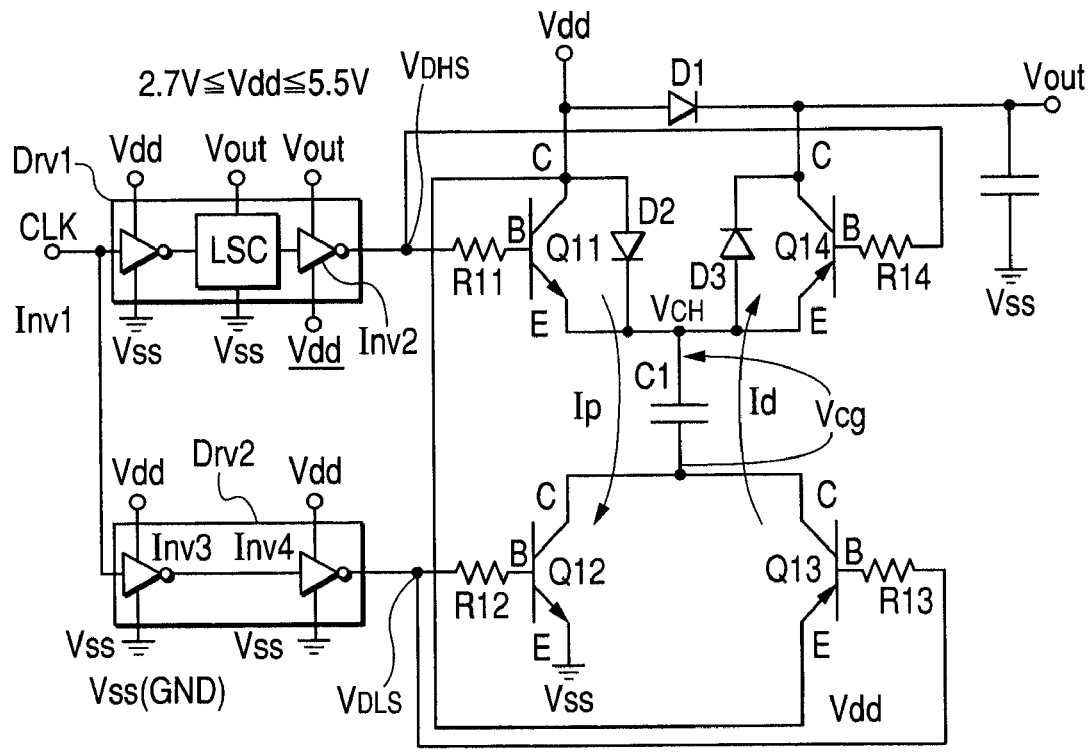
FIG. 23 is a diagram showing the configuration of a booster circuit according to a modification of the invention.

For example, as shown in FIG. 23, the first transistor Q11 and the second transistor Q12 in the booster circuit shown in FIG. 1 and the like can be replaced with NPN-type bipolar transistors. Similarly, the third transistor Q13 and the fourth transistor Q14 can be replaced with PNP bipolar transistors. A diode D2 for high-speed charging of the precharge capacitor C1 at the time of power-on is connected between the collector and the emitter of the third transistor Q13. Further, a diode D3 for high-speed charging of the output capacitor C2 at the time of power-on is connected between the emitter and the collector of the fourth transistor Q14.

Further, the booster circuit according to the invention is not limited to a booster circuit in a CCD drive LSI but can be generally applied to a booster circuit for generating a boost voltage higher than an input voltage or a power source voltage such as a booster circuit for generating a liquid crystal drive voltage in an LCD drive LSI, a booster circuit for generating a write voltage and an erase voltage in a nonvolatile memory, and the like.

The invention claimed is:

1. A semiconductor integrated circuit comprising a booster circuit on a chip, wherein in the booster circuit, a first transistor as a high-side switch for precharge and a second transistor as a low-side switch for precharge are connected to one end and the other end of a capacitor, respectively, wherein a third transistor as a high-side switch for driving output and a fourth transistor as a low-side switch for driving output are connected to the other end and the one end of the capacitor, respectively, wherein the first, second, third, and fourth transistors are driven by a clock signal, a period of one of levels of the clock signal is a precharge period in which the booster circuit constructed by a charge pump circuit charges the capacitor by an input voltage, a period of the other level of the clock signal is an output drive period in which the booster circuit constructed by the charge pump circuit outputs a boosted output voltage obtained by adding a charged voltage of the capacitor to the input voltage, wherein in the precharge period, in response to the clock signal, the first transistor as the high-side switch for precharge connected between the input voltage and the one end of the capacitor is turned on, and the second transistor as the low-side switch for precharge connected between a base potential and the other end of the capacitor is turned on, so that charging current flows from the input voltage to the base potential via the capacitor, and the charged voltage between the one end and the other end of the capacitor increases, wherein in the output drive period, in response to the clock signal, the third transistor as the high-side switch for driving output connected between the input voltage and the other end of the capacitor is turned on, and the fourth transistor as the low-side switch for driving output connected between the one end of the capacitor and the output terminal is turned on, so that the boosted output voltage obtained by adding the charged voltage of the capacitor to the input voltage is output from the output terminal, wherein the high level and the low level of a drive input signal for driving an input terminal of the first transistor as the high-side switch for precharge and an input terminal of the fourth transistor as the low-side switch for driving output in response to the clock signal are set to a level of the boosted output voltage output from the output terminal and a level of the input voltage, respectively wherein a fifth transistor as a first auxiliary switch is connected between the input voltage and the one end of the capacitor, a sixth transistor as a second auxiliary switch is connected between the one end of the capacitor and the output terminal for outputting the boosted output voltage, and wherein the high level and the low level of a drive input signal for driving an input terminal of the fifth transistor as the first auxiliary switch and an input terminal of the sixth transistor as the second auxiliary switch in response to the clock signal are set to the level of the boosted output voltage output from the output terminal and a level of the base potential, respectively, and the fifth transistor as the first auxiliary switch and the sixth transistor as the second auxiliary switch have a transistor structure of a withstand voltage higher than that of the first, second, third, and fourth transistors, and have a smaller device size.

2. A semiconductor integrated circuit comprising a booster circuit on a chip, wherein in the booster circuit, a first transistor as a high-side switch for precharge and a second transistor as a low-side switch for precharge are connected to one end and the other end of a capacitor, respectively, wherein a third transistor as a high-side switch for driving output and a fourth transistor as a low-side switch for driving output are connected to the other end and the one end of the capacitor, respectively, wherein the first, second, third, and fourth transistors are driven by a clock signal, a period of one of levels of the clock signal is a precharge period in which the booster circuit constructed by a charge pump circuit charges the capacitor by an input voltage, a period of the other level of the clock signal is an output drive period in which the booster circuit constructed by the charge pump circuit outputs a boosted output voltage obtained by adding a charged voltage of the capacitor to the input voltage, wherein in the precharge period, in response to the clock signal, the first transistor as the high-side switch for precharge connected between the input voltage and the one end of the capacitor is turned on, and the second transistor as the low-side switch for precharge connected between a base potential and the other end of the capacitor is turned on, so that charging current flows from the input voltage to the base potential via the capacitor, and the charged voltage between the one end and the other end of the capacitor increases, wherein in the output drive period, in response to the clock signal, the third transistor as the high-side switch for driving output connected between the input voltage and the other end of the capacitor is turned on, and the fourth transistor as the low-side switch for driving output connected between the one end of the capacitor and the output terminal is turned on, so that the boosted output voltage obtained by adding the charged voltage of the capacitor to the input voltage is output from the output terminal, wherein the high level and the low level of a drive input signal for driving an input terminal of the first transistor as the high-side switch for precharge and an input terminal of the fourth transistor as the low-side switch for driving output in response to the clock signal are set to a level of the boosted output voltage output from the output terminal and a level of the input voltage, respectively wherein the high level and the low level of a drive input signal for driving an input terminal of the second transistor as the low-side switch for precharge and an input terminal of the third transistor as the high-side switch for driving output in response to the clock signal are set to the level of the input voltage and a level of the base potential, respectively, wherein a fifth transistor as a first auxiliary switch is connected between the input voltage and the one end of the capacitor, a sixth transistor as a second auxiliary switch is connected between the one end of the capacitor and the output terminal for outputting the boosted output voltage, and wherein the high level and the low level of a drive input signal for driving an input terminal of the fifth transistor as the first auxiliary switch and an input terminal of the sixth transistor as the second auxiliary switch in response to the clock signal are set to the level of the boosted output voltage output from the output terminal and the level of the base potential, respectively, and the fifth transistor as the first auxiliary switch and the sixth transistor as the second auxiliary switch have a transistor structure of a withstand voltage higher than that of the first, second, third, and fourth transistors, and have a smaller device size.

3. A semiconductor integrated circuit comprising a booster circuit that is constructed by a charge pump circuit in a semiconductor integrated circuit, and that is constructed by cascaded charge pump circuits in multiple stages, wherein when an input voltage is supplied to an ante-stage charge pump circuit in the charge pump circuits in the multiple stages, an ante-stage boosted output voltage is generated from the ante-stage charge pump circuit, wherein when the ante-stage boosted output voltage generated by the ante-stage charge pump circuit is supplied to a post-stage charge pump circuit in the charge pump circuits in the multiple stages, a post-stage boosted output voltage is generated from the post-stage charge pump circuit, wherein in the post-stage charge pump circuit, a first transistor as a high-side switch for precharge and a second transistor as a low-side switch for precharge are connected to one end and the other end of a capacitor, respectively, and a third transistor as a high-side switch for driving output and a fourth transistor as a low-side switch for driving output are connected to the other end and the one end of the capacitor, respectively, wherein the first, second, third, and fourth transistors are driven by a clock signal, a period of one of levels of the clock signal is a precharge period in which the post-stage charge pump circuit charges the capacitor by the ante-stage boosted output voltage, a period of the other level of the clock signal is an output drive period in which the post-stage charge pump circuit outputs a post-stage boosted output voltage obtained by adding the charged voltage of the capacitor to the ante-stage boosted output voltage, wherein in the precharge period, in response to the clock signal, the first transistor as the high-side switch for precharge connected between the ante-stage boosted output voltage and the one end of the capacitor is turned on, and the second transistor as the low-side switch for precharge connected between a base potential and the other end of the capacitor is turned on, so that charging current flows from the ante-stage boosted output voltage to the base potential via the capacitor, and the charged voltage between the one end and the other end of the capacitor increases, wherein in the output drive period, in response to the clock signal, the third transistor as the high-side switch for driving output connected between the ante-stage boosted output voltage and the other end of the capacitor is turned on, and the fourth transistor as the low-side switch for driving output connected between the one end of the capacitor and the output terminal is turned on, so that the post-stage boosted output voltage obtained by adding the charged voltage of the capacitor to the ante-stage boosted output voltage is output from the output terminal, wherein the high level and the low level of a drive input signal for driving an input terminal of the first transistor as the high-side switch for precharge and an input terminal of the fourth transistor as the low-side switch for driving output in response to the clock signal are set to a level of the post-stage boosted output voltage and a level of the ante-stage boosted output voltage, respectively, wherein a fifth transistor as a first auxiliary switch is connected between the ante-stage boosted output voltage and the one end of the capacitor, and a sixth transistor as a second auxiliary switch is connected between the one end of the capacitor and the output terminal for outputting the post-stage boosted output voltage, and wherein the high level and the low level of a drive input signal for driving an input terminal of the fifth transistor as the first auxiliary switch and an input terminal of the sixth transistor as the second auxiliary switch in response to the clock signal are set to the level of the post-stage boosted output voltage output from the output terminal and a level of the base potential, respectively, and the fifth transistor as the first auxiliary switch and the sixth transistor as the second auxiliary switch have a transistor structure of a withstand voltage higher than that of the first, second, third, and fourth transistors, and have a smaller device size.

4. A semiconductor integrated circuit comprising a booster circuit that is constructed by a charge pump circuit in a semiconductor integrated circuit, and that is constructed by cascaded charge pump circuits in multiple stages, wherein when an input voltage is supplied to an ante-stage charge pump circuit in the charge pump circuits in the multiple stages, an ante-stage boosted output voltage is generated from the ante-stage charge pump circuit, wherein when the ante-stage boosted output voltage generated by the ante-stage charge pump circuit is supplied to a post-stage charge pump circuit in the charge pump circuits in the multiple stages, a post-stage boosted output voltage is generated from the post-stage charge pump circuit, wherein in the post-stage charge pump circuit, a first transistor as a high-side switch for precharge and a second transistor as a low-side switch for precharge are connected to one end and the other end of a capacitor, respectively, and a third transistor as a high-side switch for driving output and a fourth transistor as a low-side switch for driving output are connected to the other end and the one end of the capacitor, respectively, wherein the first, second, third, and fourth transistors are driven by a clock signal, a period of one of levels of the clock signal is a precharge period in which the post-stage charge pump circuit charges the capacitor by the ante-stage boosted output voltage, a period of the other level of the clock signal is an output drive period in which the post-stage charge pump circuit outputs a post-stage boosted output voltage obtained by adding the charged voltage of the capacitor to the ante-stage boosted output voltage, wherein in the precharge period, in response to the clock signal, the first transistor as the high-side switch for precharge connected between the ante-stage boosted output voltage and the one end of the capacitor is turned on, and the second transistor as the low-side switch for precharge connected between a base potential and the other end of the capacitor is turned on, so that charging current flows from the ante-stage boosted output voltage to the base potential via the capacitor, and the charged voltage between the one end and the other end of the capacitor increases, wherein in the output drive period, in response to the clock signal, the third transistor as the high-side switch for driving output connected between the ante-stage boosted output voltage and the other end of the capacitor is turned on, and the fourth transistor as the low-side switch for driving output connected between the one end of the capacitor and the output terminal is turned on, so that the post-stage boosted output voltage obtained by adding the charged voltage of the capacitor to the ante-stage boosted output voltage is output from the output terminal, wherein the high level and the low level of a drive input signal for driving an input terminal of the first transistor as the high-side switch for precharge and an input terminal of the fourth transistor as the low-side switch for driving output in response to the clock signal are set to a level of the post-stage boosted output voltage and a level of the ante-stage boosted output voltage, respectively wherein the high level and the low level of a drive input signal for driving an input terminal of the third transistor as the high-side switch for driving output are set to the level of the ante-stage boosted output voltage and a level of the input voltage, respectively, wherein a fifth transistor as a first auxiliary switch is connected between the ante-stage boosted output voltage and the one end of the capacitor, and a sixth transistor as a second auxiliary switch is connected between the one end of the capacitor and the output terminal for outputting the post-stage boosted output voltage, and wherein the high level and the low level of a drive input signal for driving an input terminal of the fifth transistor as the first auxiliary switch and an input terminal of the sixth transistor as the second auxiliary switch in response to the clock signal are set to the level of the post-stage boosted output voltage output from the output terminal and-level a level of the base potential, respectively, and the fifth transistor as the first auxiliary switch and the sixth transistor as the second auxiliary switch have a transistor structure of a withstand voltage higher than that of the first, second, third, and fourth transistors, and have a smaller device size.

5. A semiconductor integrated circuit comprising a booster circuit on a chip,
wherein in the booster circuit, a first transistor as a high-side switch for precharge and a second transistor as a low-side switch for precharge are connected to one end and the other end of a capacitor, respectively,
wherein a third transistor as a high-side switch for driving output and a fourth transistor as a low-side switch for driving output are connected to the other end and the one end of the capacitor, respectively,
wherein an input voltage level detection circuit for detecting a level of an input voltage and a base voltage generating circuit for generating base voltages at a plurality of levels are included, one base voltage selected from the base voltages at the plurality of levels in response to an input voltage level detection result of the input voltage level detection circuit is supplied as an output of the base voltage generating circuit to the third transistor as the high-side switch for driving output,
wherein the first, second, third, and fourth transistors are driven by a clock signal, a period of one of levels of the clock signal is a precharge period in which the booster circuit constructed by a charge pump circuit charges the capacitor by an input voltage, a period of the other level of the clock signal is an output drive period for outputting a boosted output voltage obtained by adding the charged voltage of the capacitor to the selected base voltage,
wherein in the precharge period, in response to the clock signal, the first transistor as the high-side switch for precharge connected between the input voltage and the one end of the capacitor is turned on, and the second transistor as the low-side switch for precharge connected between a base potential and the other end of the capacitor is turned on, so that charging current flows from the input voltage to the base potential via the capacitor, and the charged voltage between the one end and the other end of the capacitor increases,
wherein in the output drive period, in response to the clock signal, the third transistor as the high-side switch for driving output connected between the selected one base voltage generated from the output of the base voltage generating circuit and the other end of the capacitor is turned on, and the fourth transistor as the low-side switch for driving output connected between the one end of the capacitor and the output terminal is turned on, so that the boosted output voltage obtained by adding the charged voltage of the capacitor to the selected one base voltage is output from the output terminal, and
wherein the high level and the low level of a drive input signal for driving an input terminal of the first transistor as the high-side switch for precharge and an input terminal of the fourth transistor as the low-side switch for driving output in response to the clock signal are set to a level of the boosted output voltage output from the output terminal and a level of the input voltage, respectively.

6. The semiconductor integrated circuit according to claim 5,
wherein the high level and the low level of a drive input signal for driving an input terminal of the second transistor as the low-side switch for precharge and an input terminal of the third transistor as the high-side switch for driving output in response to the clock signal are set to the level of the input voltage and a level of the base potential, respectively.

7. The semiconductor integrated circuit according to claim 5,
wherein a fifth transistor as a first auxiliary switch is connected between the input voltage and the one end of the capacitor, a sixth transistor as a second auxiliary switch is connected between the one end of the capacitor and the output terminal for outputting the boosted output voltage, and
wherein the high level and the low level of a drive input signal for driving an input terminal of the fifth transistor as the first auxiliary switch and-the an input terminal of the sixth transistor as the second auxiliary switch in response to the clock signal are set to the level of the boosted output voltage output from the output terminal and a level of the base potential, respectively, and the fifth transistor as the first auxiliary switch and the sixth transistor as the second auxiliary switch have a transistor structure of a withstand voltage higher than that of the first, second, third, and fourth transistors, and have a smaller device size.

8. The semiconductor integrated circuit according to claim 6,
wherein a fifth transistor as a first auxiliary switch is connected between the input voltage and the one end of the capacitor, a sixth transistor as a second auxiliary switch is connected between the one end of the capacitor and the output terminal for outputting the boosted output voltage, and
wherein the high level and the low level of a drive input signal for driving an input terminal of the fifth transistor as the first auxiliary switch and an input terminal of the sixth transistor as the second auxiliary switch in response to the clock signal are set to the level of the boosted output voltage output from the output terminal and the level of the base potential, respectively, and the fifth transistor as the first auxiliary switch and the sixth transistor as the second auxiliary switch have a transistor structure of a withstand voltage higher than that of the first, second, third, and fourth transistors, and have a smaller device size.

9. The semiconductor integrated circuit according to claim 5,
wherein the first transistor is constructed by an N-channel MOS transistor whose P-type well is connected to the input voltage, the second transistor is constructed by an N-channel MOS transistor whose P-type well is connected to the ground potential, the third transistor is constructed by a P-channel MOS transistor whose N-type well is connected to the input voltage, and the fourth transistor is constructed by a P-channel MOS transistor whose N-type well is connected to one of the output terminal from which the boosted output voltage is output and the one end the capacitor.

10. The semiconductor integrated circuit according to claim 5, wherein the first transistor is constructed by an NPN-type bipolar transistor whose collector and emitter are connected to the input voltage and the one end of the capacitor, respectively, and the fourth transistor is constructed by a PNP-type bipolar transistor whose emitter and collector are connected to the one end of the capacitor and the output terminal from which the boosted output voltage is output, respectively.

11. The semiconductor integrated circuit according to claim 10, wherein a diode for high-speed charging the capacitor is connected between the collector and the emitter of the first transistor, and a diode for high-speed charging an output capacitor connected to the output terminal from which the boosted output voltage is output is connected between the emitter and the collector of the fourth transistor.

12. A semiconductor integrated circuit comprising a booster circuit that is constructed by a charge pump circuit in a semiconductor integrated circuit, and that is constructed by cascaded charge pump circuits in multiple stages, wherein when an input voltage is supplied to an ante-stage charge pump circuit in the charge pump circuits in the multiple stages, an ante-stage boosted output voltage is generated from the ante-stage charge pump circuit, wherein when the ante-stage boosted output voltage generated by the ante-stage charge pump circuit is supplied to a post-stage charge pump circuit in the charge pump circuits in the multiple stages, a post-stage boosted output voltage is generated from the post-stage charge pump circuit, wherein in the post-stage charge pump circuit, a first transistor as a high-side switch for precharge and a second transistor as a low-side switch for precharge are connected to one end and the other end of a capacitor, respectively, a third transistor as a high-side switch for driving output and a fourth transistor as a low-side switch for driving output are connected to the other end and the one end of the capacitor, respectively, wherein an input voltage level detection circuit for detecting a level of the input voltage and a base voltage generating circuit for generating base voltages at a plurality of levels are included, one base voltage selected from the base voltages at the plurality of levels in response to an input voltage level detection result of the input voltage level detection circuit is supplied as an output of the base voltage generating circuit to the third transistor as the high-side switch for driving output, wherein the first, second, third, and fourth transistors are driven by a clock signal, a period of one of levels of the clock signal is a precharge period in which the post-stage charge pump circuit charges the capacitor by the ante-stage boosted output voltage, a period of the other level of the clock signal is an output drive period in which the post-stage charge pump circuit outputs a post-stage boosted output voltage obtained by adding the charged voltage of the capacitor to the selected base voltage, wherein in the precharge period, in response to the clock signal, the first transistor as the high-side switch for precharge connected between the ante-stage boosted output voltage and the one end of the capacitor is turned on, and the second transistor as the low-side switch for precharge connected between a base potential and the other end of the capacitor is turned on, so that charging current flows from the ante-stage boosted output voltage to the base potential via the capacitor, and the charged voltage between the one end and the other end of the capacitor increases, wherein in the output drive period, in response to the clock signal, the third transistor as the high-side switch for driving output connected between the selected base voltage generated from the output of the base voltage generating circuit and the other end of the capacitor is turned on, and the fourth transistor as the low-side switch for driving output connected between the one end of the capacitor and the output terminal is turned on, so that the post-stage boosted output voltage obtained by adding the charged voltage of the capacitor to the selected base voltage is output from the output terminal, and wherein the high level and the low level of a drive input signal for driving an input terminal of the first transistor as the high-side switch for precharge and an input terminal of the fourth transistor as the low-side switch for driving output in response to the clock signal are set to a level of the post-stage boosted output voltage and a level of the ante-stage boosted output voltage, respectively.

13. The semiconductor integrated circuit according to claim 12, wherein the high level and the low level of a drive input signal for driving an input terminal of the third transistor as the high-side switch for driving output are set to the level of the ante-stage boosted output voltage and a level of the input voltage, respectively.

14. The semiconductor integrated circuit according to claim 12, wherein a fifth transistor as a first auxiliary switch is connected between the ante-stage boosted output voltage and the one end of the capacitor, a sixth transistor as a second auxiliary switch is connected between the one end of the capacitor and the output terminal for outputting the post-stage boosted output voltage, and wherein the high level and the low level of a drive input signal for driving an input terminal of the fifth transistor as the first auxiliary switch and an input terminal of the sixth transistor as the second auxiliary switch in response to the clock signal are set to the level of the post-stage boosted output voltage output from the output terminal and a level of the base potential, respectively, and the fifth transistor as the first auxiliary switch and the sixth transistor as the second auxiliary switch have a transistor structure of a withstand voltage higher than that of the first, second, third, and fourth transistors, and have a smaller device size.

15. The semiconductor integrated circuit according to claim 13, wherein a fifth transistor as a first auxiliary switch is connected between the ante-stage boosted output voltage and the one end of the capacitor, a sixth transistor as a second auxiliary switch is connected between the one end of the capacitor and the output terminal for outputting the post-stage boosted output voltage, and wherein the high level and the low level of a drive input signal for driving-the an input terminal of the fifth transistor as the first auxiliary switch and an input terminal of the sixth transistor as the second auxiliary switch in response to the clock signal are set to the level of the post-stage boosted output voltage output from the output terminal and a level of the base potential, respectively, and the fifth transistor as the first auxiliary switch and the sixth transistor as the second auxiliary switch have a transistor structure of a withstand voltage higher than that of the first, second, third, and fourth transistors, and have a smaller device size.

16. The semiconductor integrated circuit according to claim 12, wherein the first transistor is constructed by an N-channel MOS transistor whose P-type well is connected to the input voltage, the second transistor is constructed by an N-channel MOS transistor whose P-type well is connected to the ground potential, the third transistor is constructed by a P-channel MOS transistor whose N-type well is connected to the input voltage, and the fourth transistor is constructed by a P-channel MOS transistor whose N-type well is connected to one of the output terminal from which the boosted output voltage is output and the one end of the capacitor.

17. The semiconductor integrated circuit according to claim 12,
wherein the first transistor is constructed by an NPN-type bipolar transistor whose collector and emitter are connected to the input voltage and the one end of the capacitor, respectively, and the fourth transistor is constructed by a PNP-type bipolar transistor whose emitter and collector are connected to the one end of the capacitor and the output terminal from which the boosted output voltage is output, respectively.

18. The semiconductor integrated circuit according to claim 17,
wherein a diode for high-speed charging the capacitor is connected between the collector and the emitter of the first transistor, and a diode for high-speed charging an output capacitor connected to the output terminal from which the boosted output voltage is output is connected between the emitter and the collector of the fourth transistor.

* * * * *